United States Patent
Xie et al.

(10) Patent No.: US 12,420,195 B2
(45) Date of Patent: Sep. 23, 2025

(54) NAVIGATION PATH DETERMINING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Mo Xie, Shenzhen (CN); Tao Gu, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 276 days.

(21) Appl. No.: 18/351,720

(22) Filed: Jul. 13, 2023

(65) Prior Publication Data
US 2023/0356084 A1  Nov. 9, 2023

Related U.S. Application Data

(63) Continuation of application No. PCT/CN2022/127669, filed on Oct. 26, 2022.

(30) Foreign Application Priority Data

Dec. 14, 2021 (CN) .......................... 202111520035.4

(51) Int. Cl.
A63F 13/56 (2014.01)
(52) U.S. Cl.
CPC .................................... A63F 13/56 (2014.09)
(58) Field of Classification Search
None
See application file for complete search history.

(56) References Cited

U.S. PATENT DOCUMENTS

2007/0218992 A1\* 9/2007 Maehiro ............... A63F 13/577
463/31
2013/0016090 A1   1/2013 Nixon
(Continued)

FOREIGN PATENT DOCUMENTS

CN   110309236 A   10/2019
CN   112370788 A    2/2021
(Continued)

OTHER PUBLICATIONS

International Search Report and Written Opinion received for Application No. PCT/CN2022/127669 mailed Jan. 12, 2023 (English and Chinese languages), (10 pages).

*Primary Examiner* — Stephen T. Reed
(74) *Attorney, Agent, or Firm* — Crowell & Moring LLP

(57) ABSTRACT

A navigation path determining method and apparatus, a device, a storage medium, and a program product are provided. A navigation grid map is obtained corresponding to an application. The navigation grid map is marked with a primary region and a secondary region. A passage level of the primary region allows passage of virtual objects under volume levels. The secondary region includes a plurality of sub-secondary regions at different passage levels. The passage levels of the sub-secondary regions correspond to different maximum volume levels. At least one guide grid corresponding to the target grid is obtained for a target grid corresponding to a target virtual object. The target grid is located in the secondary region. Based on the guide grid, a navigation path of the target virtual object between the target grid and the primary region is determined. The present subject matter can ensure non-clipping of virtual objects.

20 Claims, 11 Drawing Sheets

(56) References Cited

U.S. PATENT DOCUMENTS

| | | | |
|---|---|---|---|
| 2016/0005229 A1* | 1/2016 | Lee | G06T 11/60 345/419 |
| 2019/0302780 A1 | 10/2019 | Sunil Kumar et al. | |
| 2020/0316473 A1* | 10/2020 | Qiu | A63F 13/56 |

FOREIGN PATENT DOCUMENTS

| | | |
|---|---|---|
| CN | 113144607 A | 7/2021 |
| CN | 113413601 A | 9/2021 |
| CN | 113758494 A | 12/2021 |
| CN | 113908551 A | 1/2022 |

\* cited by examiner

NAVIGATION PATH DETERMINING METHOD AND APPARATUS, DEVICE, STORAGE MEDIUM, AND PROGRAM PRODUCT

RELATED APPLICATION

The present application is a continuation of PCT application PCT/CN2022/127669, which claims priority to Chinese Patent Application No. 202111520035.4, entitled "NAVIGATION PATH DETERMINING METHOD AND APPARATUS, DEVICE, STORAGE MEDIUM, AND PROGRAM PRODUCT" filed on Dec. 14, 2021, which is incorporated by reference in its entirety.

FIELD OF THE TECHNOLOGY

An example of the present subject matter relates to the field of computer technology, and in particular, to a navigation path determining method and apparatus, a device, a storage medium, and a program product.

BACKGROUND

Currently, path-finding for virtual objects is one of the most important and widespread topics in gaming applications.

In the related art, path-finding for the virtual objects is performed based on edge clipping methods. For example, based on a maximum volume level corresponding to a gaming application, a navigation map of the gaming application is subjected to edge clipping to obtain a clipped navigation map. Then, based on the clipped navigation map, virtual objects at different volume levels in the gaming application are subjected to path-finding to obtain respective navigation paths. The volume levels are used for measuring occupied regions of the virtual objects in the gaming application.

However, in the related art, an edge region actually reachable by a virtual object at a small volume level will be determined as an unreachable region, and the navigation path is not reasonable enough.

BRIEF SUMMARY

An example of the present subject matter provides a navigation path determining method and apparatus, a device, a storage medium, and a program product, which can improve the rationality of a navigation path. The technical solution includes the following content.

According to one aspect of the present subject matter, a navigation path determining method is provided. The method is performed by a computer device. The method includes:

obtaining a navigation grid map corresponding to an application, the navigation grid map is marked with a primary region and a secondary region, a passage level of the primary region allowing passage of virtual objects under volume levels in the application, the secondary region including a plurality of sub-secondary regions at different passage levels, and the virtual objects allowed for passage by the passage levels of the sub-secondary regions corresponding to different maximum volume levels;

obtaining, for a target grid corresponding to a target virtual object, at least one guide grid corresponding to the target grid, the target grid is located in the secondary region, and a passage level of the guide grid is greater than or equal to a passage level of the target grid; and determining, based on the guide grid, a navigation path of the target virtual object between the target grid and the primary region.

According to one aspect of the present subject matter, a navigation grid map generating method is provided. The method is performed by a computer device. The method includes:

obtaining a grid map corresponding to an application, the grid map referring to a gridded map;

obtaining a plurality of volume levels supported by the application, the volume level is used for measuring an occupied region of a virtual object in the application; and marking the grid map according to the plurality of volume levels to obtain a navigation grid map corresponding to the application, The navigation grid map is marked with a primary region and a secondary region. A passage level of the primary region allows passage of the virtual objects under the volume levels. The secondary region includes a plurality of sub-secondary regions at different passage levels. The virtual objects allowed for passage by the passage levels of the sub-secondary regions correspond to different maximum volume levels.

According to one aspect of the present subject matter, a navigation path determining method is provided. The method is performed by a computer device. The method includes:

obtaining a navigation grid map, the navigation grid map is marked with a primary region and a secondary region, a passage level of the primary region allowing passage of vehicles under volume levels, the secondary region including a plurality of sub-secondary regions at different passage levels, and the vehicles allowed for passage by the passage levels of the sub-secondary regions corresponding to different maximum volume levels;

obtaining, for a target grid corresponding to a target vehicle, at least one guide grid corresponding to the target grid, the target grid is located in the secondary region, and a passage level of the guide grid is greater than or equal to a passage level of the target grid; and determining, based on the guide grid, a navigation path of the target vehicle between the target grid and the primary region.

According to one aspect of the present subject matter, a navigation path determining apparatus is provided. The apparatus includes:

a navigation grid map obtaining module, configured to obtain a navigation grid map corresponding to an application, the navigation grid map is marked with a primary region and a secondary region, a passage level of the primary region allowing passage of virtual objects under volume levels in the application, the secondary region including a plurality of sub-secondary regions at different passage levels, and the virtual objects allowed for passage by the passage levels of the sub-secondary regions corresponding to different maximum volume levels;

a guide grid obtaining module, configured to obtain, for a target grid corresponding to a target virtual object, at least one guide grid corresponding to the target grid, the target grid is located in the secondary region, and a passage level of the guide grid is greater than or equal to a passage level of the target grid; and a navigation path determining module, configured to determine, based on the guide grid, a navigation path of the target virtual object between the target grid and the primary region.

According to one aspect of the present subject matter, a navigation grid map generating apparatus is provided. The apparatus includes:

a grid map obtaining module, configured to obtain a grid map corresponding to an application, the grid map referring to a gridded map;

a volume level obtaining module, configured to obtain a plurality of volume levels supported by the application, the volume level is used for measuring an occupied region of a virtual object in the application; and a grid map marking module, configured to mark the grid map according to the plurality of volume levels to obtain a navigation grid map corresponding to the application, The navigation grid map is marked with a primary region and a secondary region. A passage level of the primary region allows passage of the virtual objects under the volume levels. The secondary region includes a plurality of sub-secondary regions at different passage levels. The virtual objects allowed for passage by the passage levels of the sub-secondary regions correspond to different maximum volume levels.

According to one aspect of the present subject matter, a navigation path determining apparatus is provided. The apparatus includes:

a navigation grid map obtaining module, configured to obtain a navigation grid map, the navigation grid map is marked with a primary region and a secondary region, a passage level of the primary region allowing passage of vehicles under volume levels, the secondary region including a plurality of sub-secondary regions at different passage levels, and the vehicles allowed for passage by the passage levels of the sub-secondary regions corresponding to different maximum volume levels;

a guide grid obtaining module, configured to obtain, for a target grid corresponding to a target vehicle, at least one guide grid corresponding to the target grid, the target grid is located in the secondary region, and a passage level of the guide grid is greater than or equal to a passage level of the target grid; and a navigation path determining module, configured to determine, based on the guide grid, a navigation path of the target vehicle between the target grid and the primary region.

According to one aspect of the present subject matter, a computer device is provided. The computer device includes a processor and a memory. The memory stores a computer program. The computer program is loaded and executed by the processor to implement the foregoing navigation path determining method or the foregoing navigation grid map generating method.

The computer device may be a terminal or a server.

According to one aspect of the present subject matter, a non-transitory computer-readable storage medium is provided. The readable storage medium stores a computer program. The computer program is loaded and executed by a processor to implement the foregoing navigation path determining method or the foregoing navigation grid map generating method.

According to one aspect of the present subject matter, a computer program product is provided. The computer program product includes a computer program. The computer program is stored in a non-transitory computer-readable storage medium. A processor of a computer device reads the computer program from the computer-readable storage medium. The processor executes the computer program, whereby the computer device performs the foregoing navigation path determining method or the foregoing navigation grid map generating method.

Based on a navigation grid marked with a primary region and a secondary region, a virtual object may perform path-finding in the primary region without the restriction of a passage level, and a navigation path of the virtual object between the primary region and the secondary region may be obtained in combination with a guide grid to satisfy the volume level of the virtual object, thereby ensuring non-clipping and boundary reachability of the virtual object, and improving the rationality of the navigation path.

DETAILED DESCRIPTION

To make the objects, technical solutions, and advantages of the present subject matter clearer, the following further describes implementations of the present subject matter in detail with reference to the accompanying drawings.

Figure 1:
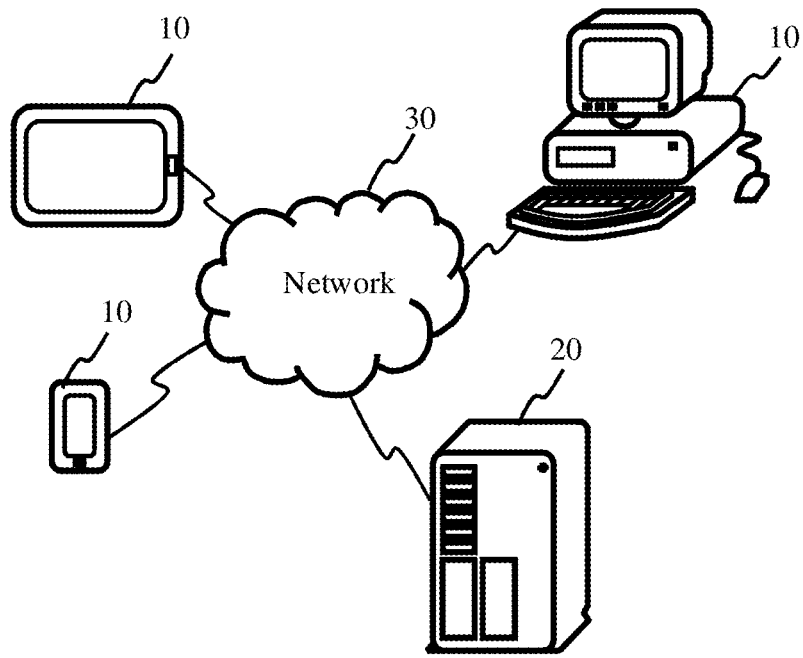
FIG. 1 is a schematic diagram of a scheme implementation environment according to an example of the present subject matter.

FIG. 1 shows a schematic diagram of a scheme implementation environment according to an example of the present subject matter. The implementation environment may include a terminal 10 and a server 20.

The terminal 10 may be an electronic device such as a mobile phone, a tablet computer, a game console, a multimedia playing device, a personal computer (PC), or a vehicle-mounted terminal. A client of a target application may be installed in the terminal 10. For example, the target application may be a gaming application, a simulative learning application, a navigation application, and any application having a path-finding function. The terminal 10 may also be referred to as a terminal device 10.

The server 20 is configured to provide a background service for the client of the target application in the terminal 10. For example, the server 20 may be a background server of the foregoing application. The server 20 may be one server, a server cluster composed of a plurality of servers, or a cloud computing service center.

The terminal 10 may communicate with the server 20 by using a network 30. The network 30 may be a wired network, or may be a wireless network.

The technical solution provided by this example of the present subject matter may be applied to a virtual scene such as gaming and simulative learning, or may be applied to a real scene such as vehicle navigation and path-finding.

The technical solution is applied to a client applying a gaming application in the virtual scene. As a player needs to control a virtual object to move for a long distance, the client determines an end position of the virtual object according to a moving operation of the player, and then performs path-finding on the virtual object from a current position to the end position according to a navigation grid map corresponding to the gaming application, so as to obtain a navigation path. The navigation grid map is marked with a primary region and a secondary region. A passage level of the primary region allows passage of virtual objects at different volume levels. That is, path-finding may be performed in the primary region without the restriction of the passage level. The secondary region includes a plurality of sub-secondary regions at different passage levels. The virtual objects allowed for passage by the passage levels of the sub-secondary regions correspond to different maximum volume levels. That is, in the secondary region, path-finding is required based on the volume levels of the virtual objects.

In some examples, the navigation path may be determined by a background service of the gaming application. After obtaining the navigation path, a background server transmits the navigation path to the client applying the gaming application.

The technical solution is applied to vehicle navigation in the real scene. After obtaining a target destination inputted by a user, a client of a navigation application plans a navigation path of a car according to a volume level of the car and a passage level corresponding to the target destination on the basis of a navigation grid map corresponding to the navigation application, so as to obtain a navigation path in which the passage level satisfies the volume level of the car.

In some examples, the navigation path may be determined by a background service of the navigation application. After obtaining the navigation path, a background server transmits the navigation path to the client of the navigation application.

The navigation path determining method in the virtual scene and the navigation path determining method in the real scene are introduced below in conjunction with different examples.

Figure 2:
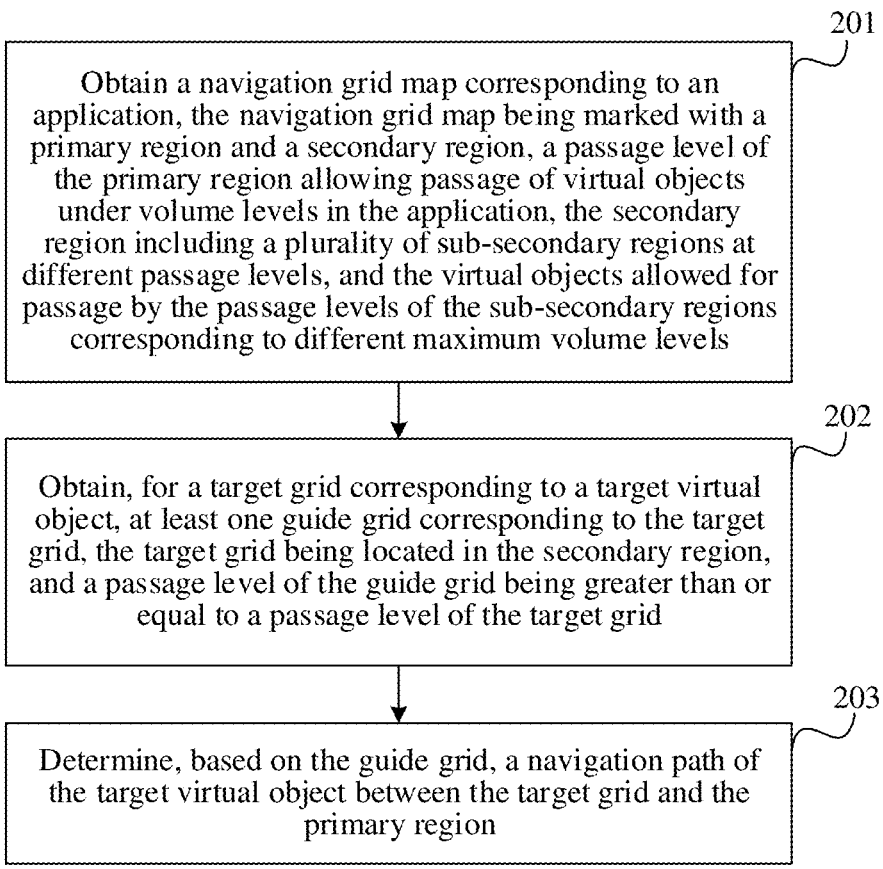
FIG. 2 is a flowchart of a navigation path determining method according to an example of the present subject matter.

FIG. 2 shows a flowchart of a navigation path determining method according to an example of the present subject matter. The execution entity of steps of the method may be the terminal 10 or the server 20 in the scheme implementation environment shown in FIG. 1. The method may include the following steps (step 201 to step 203):

Step 201: Obtain a navigation grid map corresponding to an application. The navigation grid map is marked with a primary region and a secondary region. A passage level of the primary region allows passage of virtual objects under volume levels in the application. The secondary region includes a plurality of sub-secondary regions at different passage levels. The virtual objects allowed for passage by the passage levels of the sub-secondary regions correspond to different maximum volume levels.

A grid map refers to a map obtained by gridding a navigation map corresponding to the application, namely by dividing the navigation map into a plurality of grids of the same size. In this example of the present subject matter, the navigation grid map is a map obtained by further marking the grid map corresponding to the application. For example, the primary region and the secondary region are obtained by marking passage levels of the grids in the grid map. The application may be, for example, a gaming application, a simulative learning application, and any application having a path-finding function. This example of the present subject matter is not limited thereto.

In this example of the present subject matter, the virtual object may be a virtual character or a virtual vehicle controlled by a user account in the application, or may be a virtual item or a non-player character (NPC) in a virtual environment corresponding to the application. The virtual object is not limited in this example of the present subject matter. The virtual object may be any object capable of participating in path-finding computation. In some examples, the virtual object may also be referred to as an entity. The volume level is used for measuring an occupied region (namely, volume) of the virtual object in the application. The occupied region may be a circular region, a square region, or an irregular region. As the volume level of the virtual object is higher, the occupied region thereof is larger.

The passage level may be used for measuring passage capabilities of grids or regions in the navigation grid map. As the passage levels of the grids (or regions) are higher, the volume levels of the virtual objects allowed for passage are higher. The passage levels and the volume levels of the gaming application correspond one by one. For example, if the application supports four volume levels, there are four passage levels correspondingly. The maximum passage level may allow passage of virtual objects under the four volume levels, and the minimum passage level may allow passage of only a virtual object under the minimum volume level. In some examples, single coordinates are taken as positions of virtual objects, and in consideration of volumes of the virtual objects, there is a grid or region (for example, a grid or region adjacent to a boundary) not reachable by the minimum virtual object. Therefore, the navigation grid map correspondingly includes a zero-order passage level to represent that the region is not reachable by the virtual object. A passage level corresponding to an edge region (such as a virtual wall or a virtual obstacle) of the navigation grid map may be set as a zero-order passage level, but the edge region will be generally marked separately from the region not reachable by the minimum virtual object.

In some examples, the primary region may be obtained by marking the navigation grid map based on the maximum volume level corresponding to the application, and the secondary region may be a region other than the primary region in the navigation grid map. The sub-secondary region is a region obtained by further marking the secondary region according to the remaining volume levels except the maximum volume level. For example, grids with the same passage level constitute the sub-secondary region under the passage level.

Figure 3:
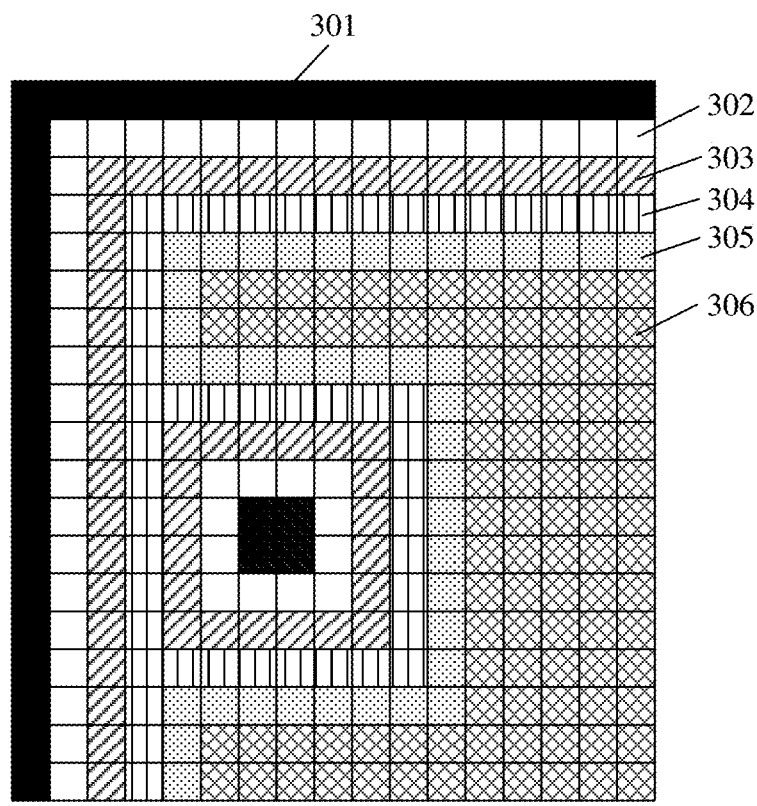
FIG. 3 shows a schematic diagram of a partial region of a navigation grid map.

FIG. 3 shows a partial region of a navigation grid map. The partial region includes an edge region 301, a sub-secondary region 302, a sub-secondary region 303, a sub-secondary region 304, a sub-secondary region 305, and a primary region 306. It is assumed that the application corresponds to four volume levels, which are ranked sequentially in ascending order of sizes of the volume levels: a first-order volume level, a second-order volume level, a third-order volume level, and a fourth-order volume level. Corresponding passage levels are: a first-order passage level, a second-order passage level, a third-order passage level, and a fourth-order passage level. The passage level of the primary region 306 may be marked as the fourth-order passage level. The passage level of the sub-secondary region 305 may be marked as the third-order passage level. The passage level of the sub-secondary region 304 may be marked as the second-order passage level. The passage level of the sub-secondary region 303 may be marked as the first-order passage level. The passage level of the sub-secondary region 302 may be marked as the zero-order passage level. No passage level is set for the edge region 301.

Step 202: Obtain, for a target grid corresponding to a target virtual object, at least one guide grid corresponding to the target grid. The target grid is located in the secondary region, and a passage level of the guide grid is greater than or equal to a passage level of the target grid.

In some examples, the target virtual object may be any virtual object in the application, and the target grid may be any grid allowing passage of the target virtual object in the secondary region. The guide grid is used for indicating a grid of a navigation path between the grid in the secondary region and the primary region.

In an example, the guide grid determining method may be as follows: obtaining direction guide information corresponding to the navigation grid map, the direction guide information is used for recording guide grids corresponding to grids; and obtaining at least one guide grid corresponding to the target grid according to the direction guide information. The first guide grid corresponding to the target grid is determined according to the direction guide information of the target grid. An n+1 th guide grid corresponding to the target grid is determined according to the direction guide information of an nth guide grid corresponding to the target grid. The n+1th guide grid is adjacent to the nth guide grid. n is a positive integer.

In some examples, the direction guide information may be determined during the marking process of the sub-secondary region. For the target grid, guide information of the target grid may be used for indicating a guide grid adjacent to the target grid. The direction of the direction guide information of the target grid points to a grid having a passage level equal to or greater than the passage level of the target grid. The direction guide information may also be used for indicating a navigation path between the target grid and the primary region. That is, the direction guide information is recorded with guide grids required for constituting the navigation path between the target grid and the primary region. A specific process of determining the direction guide information will be introduced below in detail and is not repeated herein.

In some examples, the guide grid may further include a primary guide grid and a secondary guide grid. The primary guide grid refers to a grid adjacent to the secondary region in the primary region. The secondary guide grid refers to a grid in the secondary region.

Figure 4:
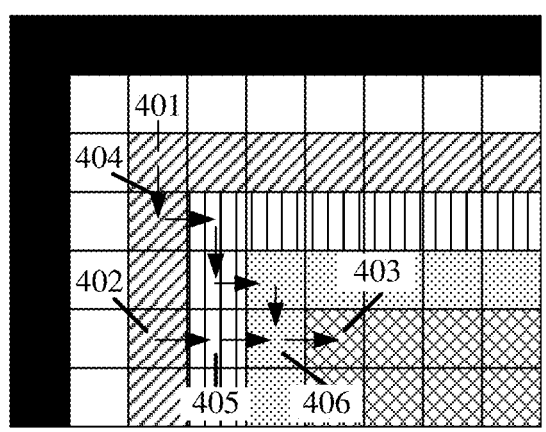
FIG. 4 shows a schematic diagram of direction guide information.

FIG. 4 shows direction guide information. A grid 403 is located in the primary region, and a grid 401 and a grid 402 are located in the secondary region. A first guide grid corresponding to the grid 401 and adjacent to the grid 401 may be obtained according to direction guide information 404 of the grid 401, a second guide grid corresponding to the grid 401 and adjacent to the first guide grid may be obtained according to direction guide information of the first guide grid, and so on, five secondary guide grids corresponding to the grid 401 and a primary guide grid (namely, the grid 403) may be obtained. In the same way, for the grid 402, two secondary guide grids corresponding to the grid 402 and the primary guide grid (namely, the grid 403) may be obtained.

Step 203: Determine, based on the guide grid, a navigation path of the target virtual object between the target grid and the primary region.

In some examples, since the passage level of the navigation grid is greater than the passage level of the target grid, the passage level of the navigation path obtained based on the guide grid allows passage of virtual objects satisfying the passage level of the target grid, thereby ensuring that the target virtual object may reach the target grid without clipping when the target virtual object satisfies the passage level of the target grid. The clipping refers to a phenomenon of penetration and superposition between the virtual object and the edge region.

In an example, the navigation path obtaining process may be as follows: determining, based on the passage level of the guide grid and a volume level of the target virtual object, the navigation path of the target virtual object between the target grid and the primary region when the passage level of the target grid does not allow passage of the target virtual object.

In some examples, the process may specifically be as follows: selecting a target secondary guide grid from secondary guide grids corresponding to the target grid based on the passage level of the guide grid and the volume level of the target virtual object, a passage level of the target secondary guide grid allowing passage of the target virtual object, and a distance between the target secondary guide grid and the target grid is less than a distance between another secondary guide grid in the secondary guide grids corresponding to the target grid and the target grid; determining a path combined by the target secondary guide grid, the secondary guide grids between the target secondary guide grid and primary guide grids corresponding to the target grid, and the primary guide grids corresponding to the target grid as the navigation path of the target virtual object between the target grid and the primary region in the presence of the target secondary guide grid; and determining a path combined by the primary guide grids corresponding to the target grid as the navigation path of the target virtual object between the target grid and the primary region in the absence of the target secondary guide grid.

Referring to FIG. 4, the grid 402 corresponds to a secondary guide grid 405, a secondary guide grid 406, and the primary guide grid 403. When the passage level of the grid 402 does not allow passage of the target virtual object, if the passage levels of both the secondary guide grid 405 and the secondary guide grid 406 satisfy the volume level of the target virtual object, the secondary guide grid 405 adjacent to the grid 402 is determined as a target secondary guide grid, and a path constituted by the secondary guide grid 405, the secondary guide grid 406, and the primary guide grid 403 is determined as a navigation path of the target virtual object between the grid 402 and the primary region. If the passage level of neither the secondary guide grid 405 nor the secondary guide grid 406 satisfies the volume level of the target virtual object, it is indicated that the target virtual object cannot enter the secondary region, and the primary guide grid 403 is replaced with a position finally reached by the target virtual object.

When the passage level of the target grid does not allow passage of the target virtual object, a grid may be selected from the guide grid to replace the target grid in this example of the present subject matter, thereby avoiding clipping of the virtual object.

In some examples, when the passage level of the target grid allows passage of the target virtual object, a path combined by the guide grids is determined as the navigation path of the target virtual object between the target grid and the primary region.

Referring to FIG. 4, when the passage level of the grid 402 allows passage of the target virtual object, a path constituted by the grid 402, the secondary guide grid 405, the secondary guide grid 406, and the primary guide grid 403 is determined as the navigation path of the target virtual object between the grid 402 and the primary region.

In summary, according to the technical solution provided by this example of the present subject matter, based on a guide grid marked with a primary region and a secondary region, a virtual object may perform path-finding in the primary region without the restriction of a passage level, and a navigation path of the virtual object between the primary region and the secondary region may be obtained in combination with the guide grid to satisfy the volume level of the virtual object, thereby ensuring non-clipping and boundary reachability of the virtual object, and improving the rationality of the navigation path. Furthermore, during the path-finding process of target virtual objects, for a target virtual object at any volume level, a guide grid corresponding to the target virtual object only needs to be determined without comparing passage levels and volume levels of grids one by one, so as to obtain a navigation path satisfying boundary reachability and non-clipping, thereby reducing the amount of computations in the path-finding process, and improving the determination efficiency of the navigation path. Also, the rationality of the navigation path, namely the adaptability of the navigation path to the volume level of the target virtual object, can be ensured.

In addition, when the passage level of the target grid does not allow passage of the target virtual object, a grid may be selected from the guide grid to replace the target grid, thereby avoiding clipping of the virtual object, and further improving the rationality of the navigation path. Furthermore, the target grid is replaced with a grid nearest to the target grid and allowing passage of the target virtual object, thereby improving the rationality of the navigation path and improving the passage rationality and truth of the target virtual object.

In addition, the guide grid corresponding to the target grid is determined through the direction guide information, and the first guide grid corresponding to the target grid is determined according to the direction guide information of the target grid. An n+1th guide grid corresponding to the target grid is determined according to the direction guide information of an nth guide grid corresponding to the target grid. A guide relationship between adjacent grids is recorded based on the direction guide information, and a navigation path determining mode of determining adjacent grids by cumulative grid progression improves the accuracy of the navigation path while improving the rationality of the navigation path.

Figure 5:
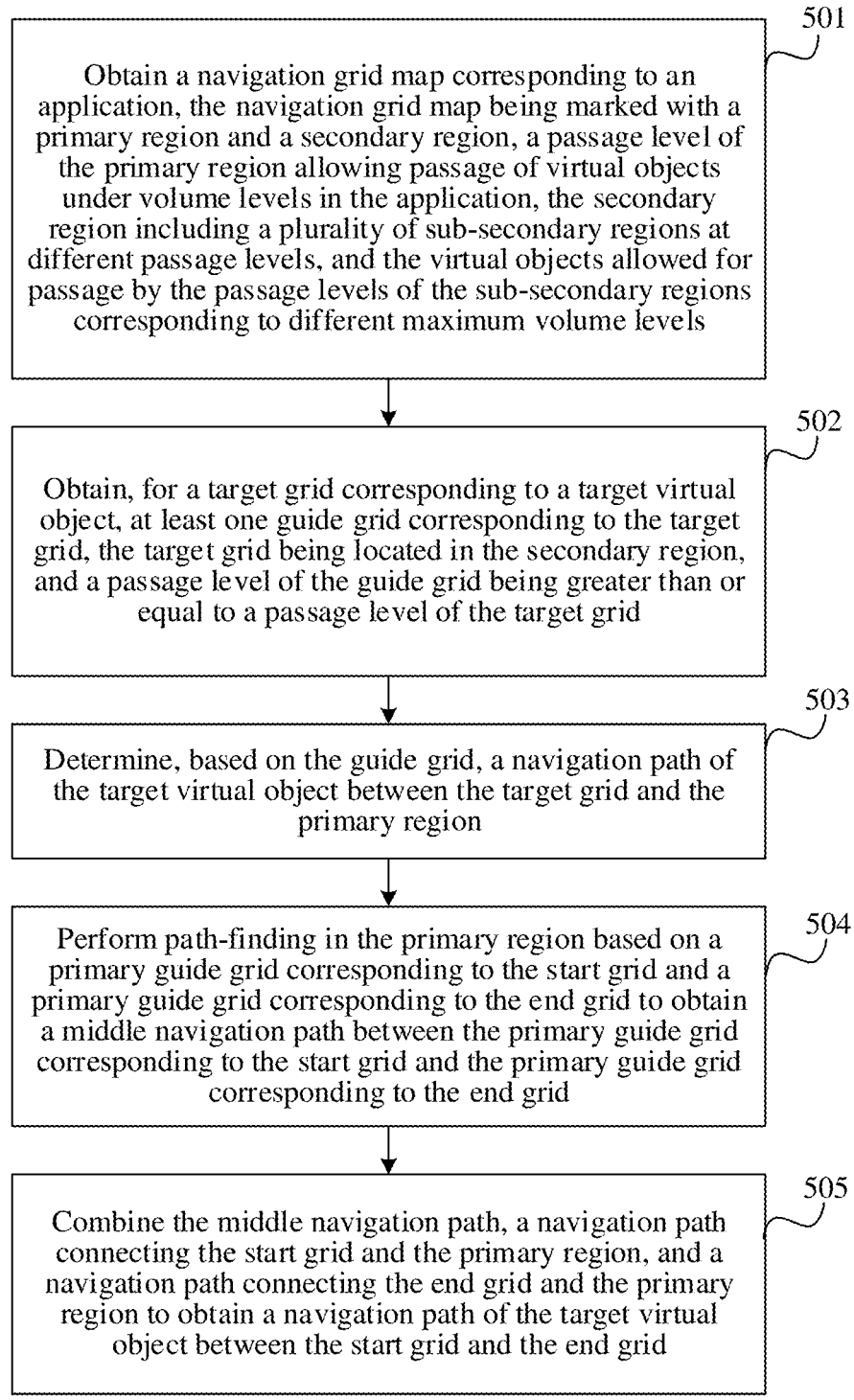
FIG. 5 is a flowchart of a navigation path determining method according to another example of the present subject matter.

FIG. 5 shows a flowchart of a navigation path determining method according to another example of the present subject matter. The execution entity of steps of the method may be the terminal 10 or the server 20 in the scheme implementation environment shown in FIG. 1. The method may include the following steps (step 501 to step 505):

Step 501: Obtain a navigation grid map corresponding to an application. The navigation grid map is marked with a primary region and a secondary region. A passage level of the primary region allows passage of virtual objects under volume levels in the application. The secondary region includes a plurality of sub-secondary regions at different passage levels. The virtual objects allowed for passage by the passage levels of the sub-secondary regions correspond to different maximum volume levels.

Step 502: Obtain, for a target grid corresponding to a target virtual object, at least one guide grid corresponding to the target grid. The target grid is located in the secondary region, and a passage level of the guide grid is greater than or equal to a passage level of the target grid.

Step 503: Determine, based on the guide grid, a navigation path of the target virtual object between the target grid and the primary region.

Step 501 to step 503 are the same as the foregoing example. The contents of step 501 to step 503 may be referred to the foregoing example, and will not be repeated herein.

In some examples, the target grid may include a start grid and an end grid. A navigation path connecting the start grid and the primary region and a navigation path connecting the end grid and the primary region may be obtained based on the foregoing steps. The navigation paths of the start grid and the end grid in the primary region may be referred to the following step 504 and step 505. The start grid may be a current location of the target virtual object or an initial position of the target virtual object in a virtual environment. The end grid refers to a position where the target virtual object is expected to reach.

Step 504: Perform path-finding in the primary region based on a primary guide grid corresponding to the start grid and a primary guide grid corresponding to the end grid to obtain a middle navigation path between the primary guide grid corresponding to the start grid and the primary guide grid corresponding to the end grid.

The middle navigation path refers to a path connecting the primary guide grid corresponding to the start grid and the primary guide grid corresponding to the end grid. A passage level of the middle navigation path satisfies the volume level of the target virtual object.

In an example, the middle navigation path obtaining process may include the following contents:

1: Perform path-finding in the primary region by taking the primary guide grid corresponding to the start grid as a start and the primary guide grid corresponding to the end grid as an end to obtain a candidate middle navigation path.

Grids bypassed by the candidate middle navigation path are all located in the primary region. The candidate middle navigation path may refer to a shortest path connecting the primary guide grid corresponding to the start grid and the primary guide grid corresponding to the end grid in the primary region. In some examples, path-finding may be performed in the primary region using an A* algorithm (performing extended path-finding in a square), a NavMesh algorithm (performing extended path-finding in a triangle), and the like.

2: Optimize, according to a jump point grid in the primary region, the candidate middle navigation path to obtain the middle navigation path. The jump point grid is used for indicating the presence of a secondary navigation path satisfying the volume level of the target virtual object in the secondary region. The secondary navigation path includes an association point grid of the jump point grid in the secondary region.

In some examples, the jump point grid refers to a grid adjacent to the secondary region in the primary region. The association point grid refers to a grid having the highest passage level in the secondary region and adjacent to the primary region, and the primary guide grid corresponding to the association point grid may be determined as the jump point grid of the association point grid. The jump point grid corresponding to the navigation grid map is not changed in the navigation process. A secondary navigation path between the jump point grids may be adjusted according to the passage level of the virtual object. The secondary navigation path starts from one jump point grid ends at another jump point grid.

Figure 6:
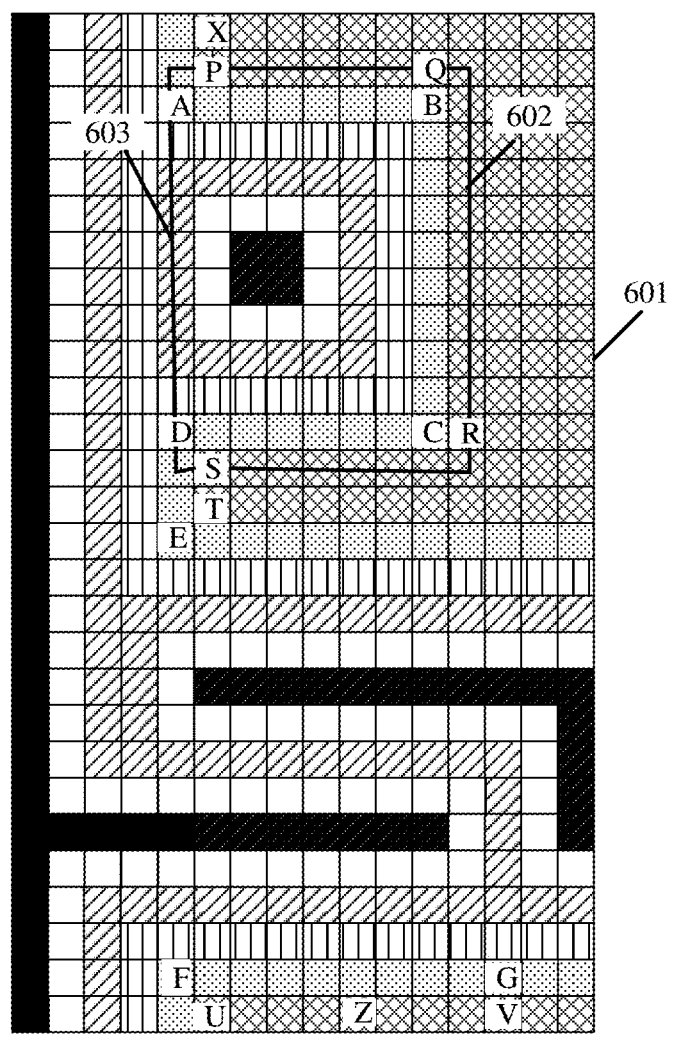
FIG. 6 is a schematic diagram of a middle navigation path determining method according to an example of the present subject matter.

Referring to FIG. 6, a partial region 601 of the navigation grid map includes a jump point grid P (corresponding to an association point grid A), a jump point grid Q (corresponding to an association point grid B), a jump point grid R (corresponding to an association point grid C), a jump point grid S (corresponding to an association point grid D), a jump point grid T (corresponding to an association point grid E), a jump point grid V (corresponding to an association point grid G), and a jump point grid U (corresponding to an association point grid F). The jump point grid is located in the primary region, and the association point grid is located in the sub-secondary region having the highest passage level.

In some examples, path-finding is performed in the primary region according to the jump point grid to obtain a primary navigation path corresponding to the middle navigation path. When a length relationship between a secondary navigation path corresponding to the jump point grid and the primary navigation path satisfies a first condition, the primary navigation path is replaced with the secondary navigation path to obtain the middle navigation path.

The first condition may be that the length of the secondary navigation path corresponding to the jump point grid is less than the length of the primary navigation path corresponding to the jump point grid, or may be that a ratio between the length of the secondary navigation path corresponding to the jump point grid and the length of the primary navigation path corresponding to the jump point grid is less than a set threshold. That is, when the secondary navigation path corresponding to the jump point grid is superior to the primary navigation path corresponding to the jump point grid, the primary navigation path corresponding to the jump point grid may be replaced with the secondary navigation path corresponding to the jump point grid. When the primary navigation path corresponding to the jump point grid is superior to the secondary navigation path corresponding to the jump point grid, the primary navigation path corresponding to the jump point grid continues to be used.

Referring to FIG. 6, it is assumed that the primary guide grid corresponding to the start grid is a grid X and the primary guide grid corresponding to the end grid is a grid S. A corresponding candidate middle navigation path between the grid X and the grid S is first obtained. During the path-finding process, the client may find the jump point grid P, the jump point grid Q, the jump point grid R, and the jump point grid S. A secondary navigation path 603 having the shortest length under the first-order passage level is present between the jump point grid P and the jump point grid S. When the volume level of the target virtual object is the first-order volume level, a primary navigation path 602 may be replaced with the secondary navigation path 603 since the length of the secondary navigation path 603 is less than the length of the primary navigation path 602. If the volume level of the target virtual object is the second-order volume level, the secondary navigation path 603 is not available. In this case, a secondary navigation path under the second-order passage level present between the jump point grid P and the jump point grid S may be obtained, and then compared with the primary navigation path 602 to determine whether replacement is required. In some examples, when the middle navigation path has a secondary navigation path, the middle navigation path having the secondary navigation path is required to be superior to the middle navigation path having the primary navigation path.

In an example, the navigation grid map includes a first region and a second region, which may be connected by the secondary region but cannot be connected by the primary region. Path-finding may be performed in the secondary region based on the jump point grid in the navigation grid map to obtain a middle navigation path of the target virtual object between the start grid and the end grid. For example, referring to FIG. 6, path-finding may be performed in the secondary region through the jump point grid for the grid X and a grid Z to obtain a middle navigation path between the grid X and the grid Z.

In a feasible example, a passage level of a straight path between the end grid and the start grid is obtained when a distance between the end grid and the start grid is less than a threshold and the end grid and the start grid are located in a same secondary region. The straight path is determined as the navigation path of the target virtual object between the start grid and the end grid when the passage level of the straight path allows passage of the target virtual object. A minimum passage level is selected from passage levels of grids bypassed by the straight path and determined as the passage level of the straight path. The threshold may be adaptively set and modified according to actual use demands.

Figure 7:
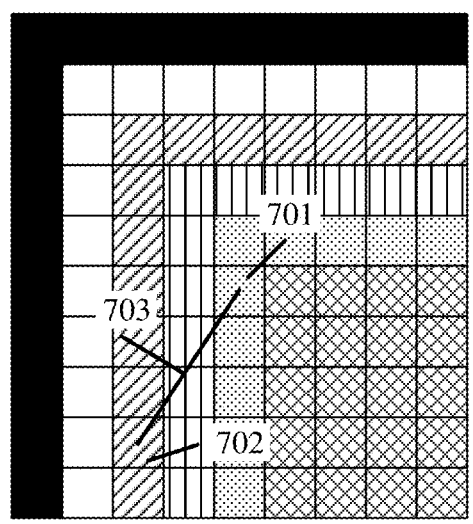
FIG. 7 is a schematic diagram of a short path optimization method according to an example of the present subject matter.
Figure 8:
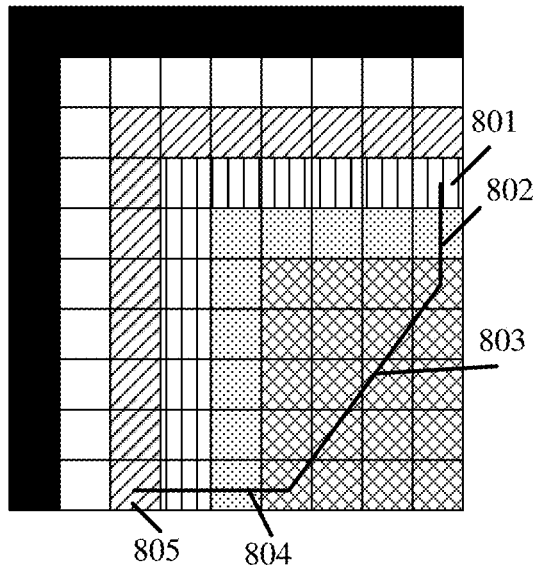
FIG. 8 is a schematic diagram of a three-section path-finding method according to an example of the present subject matter.

For example, referring to FIG. 7, the length of a straight path 703 between a start grid 701 and an end grid 702 is less than a threshold, and a passage level of the straight path 703 is the first-order passage level (namely, a passage level corresponding to the start grid 701). If the volume level of the target virtual object is the first-order volume level, the straight path 703 is determined as the navigation path of the target virtual object between the start grid and the end grid. If the volume level of the target virtual object is greater than the first-order volume level, a navigation path between the start grid 701 and the primary region, a navigation path between the end grid 702 and the primary region, and a middle navigation path corresponding to the start grid 701 and the end grid 702 are obtained and then combined to obtain the navigation path of the target virtual object between the start grid and the end grid.

Step 505: Combine the middle navigation path, a navigation path connecting the start grid and the primary region, and a navigation path connecting the end grid and the primary region to obtain a navigation path of the target virtual object between the start grid and the end grid.

A middle navigation path 803, a navigation path 802 connecting a start grid 801 and the primary region, and a navigation path 804 connecting an end grid 805 and the primary region are combined to obtain a navigation path of the target virtual object between the start grid 801 and the end grid 805.

In some examples, when both the start grid and the end grid corresponding to the target virtual object are in the primary region, path-finding may be directly performed in the primary region based on the jump point grid and the end grid to obtain a navigation path of the target virtual object between the start grid and the end grid.

When the start grid corresponding to the target virtual object is in the primary region and the end grid is in the secondary region, the navigation path connecting the end grid and the primary region and the middle navigation path corresponding to the target virtual object may be combined to obtain the navigation path of the target virtual object between the start grid and the end grid.

When the start grid corresponding to the target virtual object is in the secondary region and the end grid is in the primary region, the navigation path connecting the end grid and the primary region and the middle navigation path corresponding to the target virtual object may be combined to obtain the navigation path of the target virtual object between the start grid and the end grid.

In summary, according to the technical solution provided by this example of the present subject matter, based on a navigation grid marked with a primary region and a secondary region, a virtual object may perform path-finding in the primary region without the restriction of a passage level, and a navigation path of the virtual object between the primary region and the secondary region may be obtained in combination with a guide grid to satisfy the volume level of the virtual object, thereby ensuring non-clipping and boundary reachability of the virtual object, and improving the rationality of the navigation path.

On the basis of the navigation grid marked with the primary region and the secondary region, the navigation path of the virtual object is obtained in a sectional manner, thereby ensuring that the navigation path of the virtual object satisfies the volume level of the virtual object, and further improving the rationality of the navigation path.

In addition, a navigation path of a terminal is optimized by a jump point grid, whereby the virtual object is prevented from detouring while ensuring non-clipping of the virtual object, and the function of differential passage of virtual objects at different volume levels in a narrow channel, thereby further improving the rationality of the navigation path.

In addition, when a distance between an end grid corresponding to a target virtual object and a start grid corresponding to the target virtual object is less than a threshold and the end grid and the start grid are located in a same secondary region, a straight path, satisfying a volume level of the target virtual object, between the end grid and the start grid is determined as a navigation path of the target virtual object between the start grid and the end grid, whereby while ensuring that a navigation path satisfying boundary reachability and non-clipping is obtained, the navigation path is optimized, thereby further improving the rationality of the navigation path.

Figure 9:
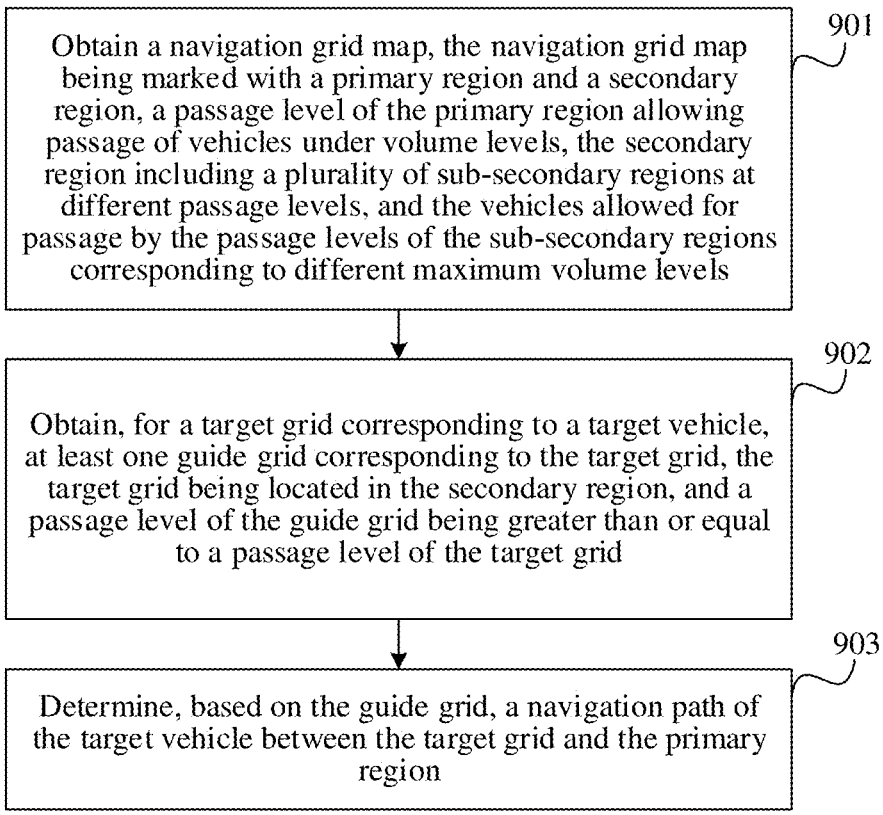
FIG. 9 is a flowchart of a navigation path determining method according to another example of the present subject matter.

FIG. 9 shows a flowchart of a navigation path determining method according to another example of the present subject matter. The execution entity of steps of the method may be the terminal 10 or the server 20 in the scheme implementation environment shown in FIG. 1. The method may include the following steps (step 901 to step 903):

Step 901: Obtain a navigation grid map. The navigation grid map is marked with a primary region and a secondary region. A passage level of the primary region allows passage of vehicles under volume levels. The secondary region includes a plurality of sub-secondary regions at different passage levels. The vehicles allowed for passage by the passage levels of the sub-secondary regions correspond to different maximum volume levels.

In this example of the present subject matter, the navigation grid map may be a grid map corresponding to a map for depicting a real scene such as a vehicle-mounted navigation map, an urban path planning map, and any map drawn according to a real environment. The vehicle refers to a vehicle in the real scene such as a car, a truck, a motorcycle, a bicycle, or another real transportation means. The volume level in this example of the present subject matter may be used for measuring an occupied region of the vehicle. For example, in a navigation grid map under a 3D type, the occupied region may be a regular three-dimensional region (such as a cube), and in a navigation grid map under a planar type, the occupied region may be a regular planar region (such as a square).

The passage level may be used for measuring passage capabilities of grids or regions in the navigation grid map. The passage levels correspond to the volume levels one by one. In some examples, the volume level of the vehicle may be divided according to the size of the occupied region of the vehicle to obtain a plurality of volume levels, and then corresponding passage levels are obtained according to the plurality of volume levels. For example, the truck may be divided into a fourth-order volume level, the car may be divided into a third-order volume level, the motorcycle may be divided into a second-order volume level, and the bicycle may be divided into a first-order volume level. Correspondingly, the passage levels include a fourth-order passage level, a third-order passage level, a second-order passage level, and a first-order passage level. The truck may pass in a region of the fourth-order passage level but cannot pass in a region of the third-order passage level or the second-order passage level or the first-order passage level.

In some examples, the primary region and the secondary region cover a passable region (for example, a road region) of the vehicle in a real environment. The primary region in the navigation grid map is marked based on a maximum volume level. For example, in the primary region obtained based on division of the fourth-order volume level, the vehicles such as the truck, the car, the motorcycle, and the bicycle may pass without the restriction of passage levels. The sub-secondary region in the navigation grid map is marked based on the volume levels. For example, in the secondary region, a passable region of a car is divided into a sub-secondary region. A passage level corresponding to the sub-secondary region corresponds to a volume level of the car.

In some examples, as the primary region and the sub-secondary region are marked, some margins may be adaptively increased on the basis of the volume level, so as to prevent collision between the vehicle and an edge region in the navigation grid map (for example, a building, an obstacle, a shield, a traffic sign, and other regions).

Figure 10:
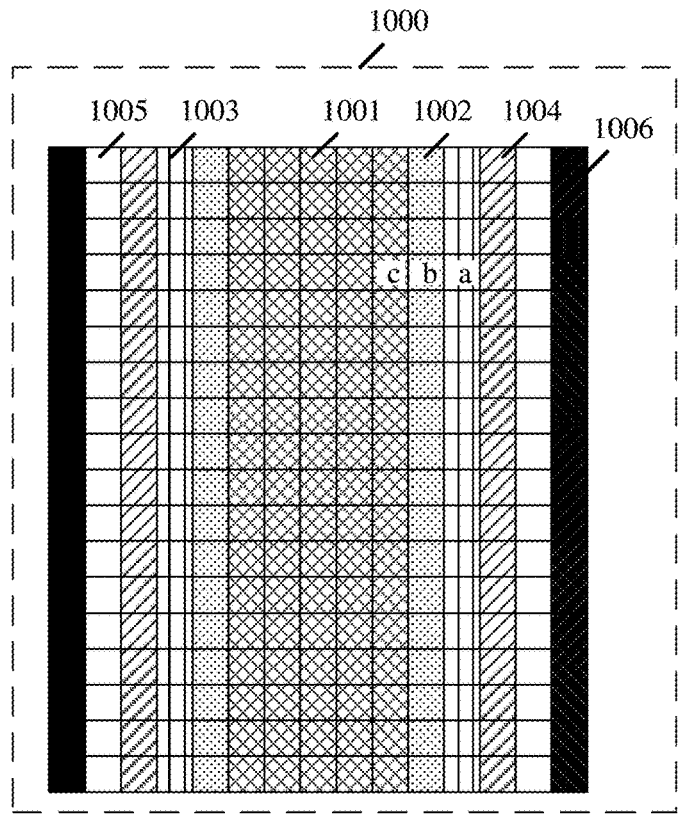
FIG. 10 shows a schematic diagram of a road region in a navigation grid map.

In an example, referring to FIG. 10, a region 1000 in the navigation grid map corresponds to a certain real road. A passage level of a primary region 1001 is a fourth-order passage level. The truck, the car, the motorcycle, and the bicycle may all pass in the primary region 1001. A passage level of a sub-secondary region 1002 is a third-order passage level. The car, the motorcycle, and the bicycle may all pass in the sub-secondary region 1002. A passage level of a sub-secondary region 1003 is a second-order passage level. The motorcycle and the bicycle may both pass in the sub-secondary region 1003. A passage level of a sub-secondary region 1004 is a first-order passage level. The bicycle may pass in the sub-secondary region 1004. A passage level of a sub-secondary region 1005 is a zero-order passage level. That is, the sub-secondary region 1005 is a region not reachable by the vehicle. An edge region 1006 corresponds to a road boundary.

Step 902: Obtain, for a target grid corresponding to a target vehicle, at least one guide grid corresponding to the target grid. The target grid is located in the secondary region, and a passage level of the guide grid is greater than or equal to a passage level of the target grid.

The target vehicle may be a vehicle at any volume level, and the target grid may be any grid allowing passage of the target vehicle in the secondary region. For example, referring to FIG. 10, when the target vehicle is the car, the target grid may refer to any grid in the sub-secondary region 1002.

The guide grid is used for indicating a grid of a navigation path between the grid in the secondary region and the primary region. The guide grid includes a primary guide grid and a secondary guide grid. The primary guide grid refers to a grid adjacent to the secondary region in the primary region. The secondary guide grid refers to a grid in the secondary region. For example, referring to FIG. 10, a grid a corresponds to a primary guide grid c and a secondary guide grid d. In some examples, the guide grids of the grid may be determined according to direction guide information of the grid. The direction guide information is used for recording the guide grids of the grid. For example, the secondary guide grid d may be determined according to the direction guide information of the grid a. The primary guide grid c is determined according to the direction guide information of the secondary guide grid d.

Step 903: Determine, based on the guide grid, a navigation path of the target vehicle between the target grid and the primary region.

When the target vehicle is located in the primary region, the target vehicle cannot collide with the edge region of the navigation grid map since the passage level of the primary region allows passage of vehicles under volume levels. However, when the target vehicle is located in the secondary region, the target vehicle collides with the edge region of the navigation grid map since vehicles allowed for passage by the passage levels of the sub-secondary regions correspond to the maximum volume level. Therefore, when the target vehicle is located in the secondary region, the target vehicle is guided out of the secondary region through the guide grid satisfying the target vehicle based on the passage level, thereby avoiding collision between the target vehicle and the edge region. The method for generating, based on a guide grid, a navigation path between a target grid and a primary region is the same as the description of the foregoing example, and is not repeated here.

In an example, the target grid may include a start grid and an end grid. The start grid may be a current location of the target vehicle. The end grid refers to a position where the target vehicle is expected to reach. By using the same method as that in the foregoing example, a middle navigation path of the target vehicle between a primary guide grid corresponding to the start grid and a primary guide grid corresponding to the end grid, a navigation path connecting the start grid and the primary region, and a navigation path connecting the end grid and the primary region may be obtained. The middle navigation path corresponding to the target vehicle, the navigation path connecting the start grid and the primary region, and the navigation path connecting the end grid and the primary region are combined to obtain a navigation path of the target vehicle between the start grid and the end grid.

In a feasible example, a passage level of a straight path between the end grid and the start grid is obtained when a distance between the end grid and the start grid is less than a threshold and the end grid and the start grid are located in a same secondary region. The straight path is determined as the navigation path of the target vehicle between the start grid and the end grid when the passage level of the straight path allows passage of the target vehicle.

When the start grid corresponding to the target vehicle is in the primary region and the end grid is in the secondary region, the navigation path connecting the end grid and the primary region and the middle navigation path corresponding to the target vehicle may be combined to obtain the navigation path of the target vehicle between the start grid and the end grid.

When the start grid corresponding to the target vehicle is in the secondary region and the end grid is in the primary region, the navigation path connecting the end grid and the primary region and the middle navigation path corresponding to the target vehicle may be combined to obtain the navigation path of the target vehicle between the start grid and the end grid.

Details not detailed in this example may be similar to the corresponding examples of FIG. 2 and FIG. 5.

In summary, according to the technical solution provided by this example of the present subject matter, based on a navigation grid marked with a primary region and a secondary region, a vehicle may perform path-finding in the primary region without the restriction of a passage level, and a navigation path of the vehicle between the primary region and the secondary region may be obtained in combination with a guide grid to satisfy the volume level of the vehicle, whereby vehicles at different volume levels are based on the same navigation grid map in a real path-finding scene to avoid the problem of collision between a vehicle (for example, a car) and an edge region (for example, a road boundary), thereby improving the rationality of the navigation path. Also, for vehicles at different volume levels, there is no need to specifically generate navigation grid maps corresponding to the passage levels, thereby reducing the workload of making the navigation grid maps and saving costs.

On the basis of the navigation grid marked with the primary region and the secondary region, the navigation path of the vehicle is obtained in a sectional manner, thereby ensuring that the navigation path of the vehicle satisfies the volume level of the vehicle, and further improving the rationality of the navigation path.

Figure 11:
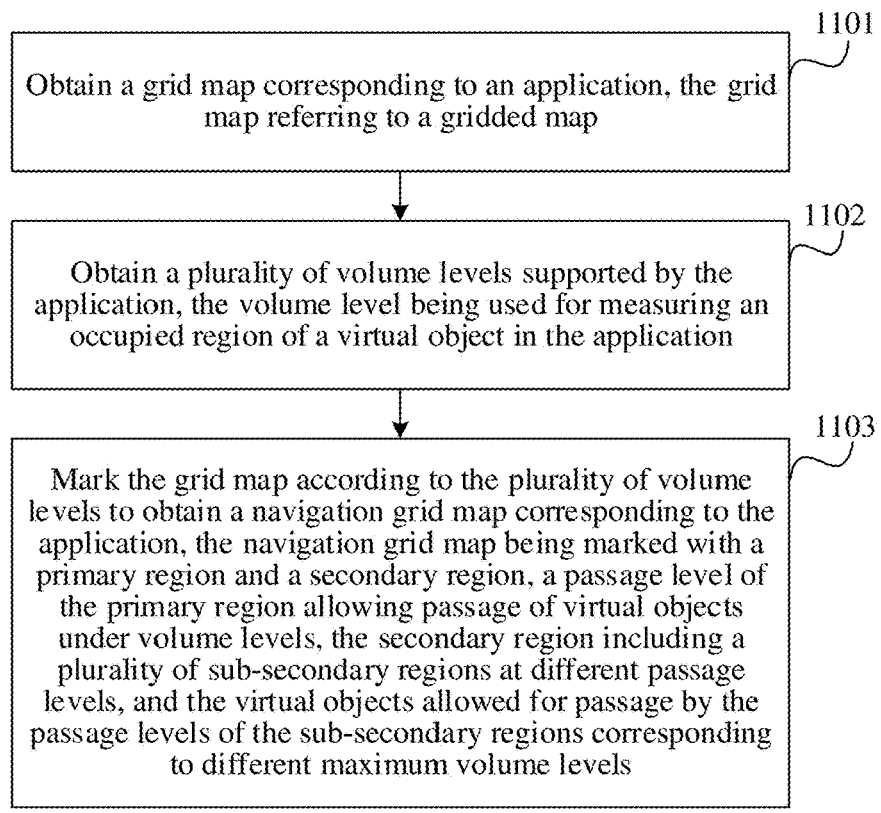
FIG. 11 is a flowchart of a navigation grid map generating method according to an example of the present subject matter.

FIG. 11 shows a flowchart of a navigation grid map generating method according to an example of the present subject matter. The execution entity of steps of the method may be the terminal 10 or the server 20 in the scheme implementation environment shown in FIG. 1. The method may include the following steps (step 1101 to step 1103):

Step 1101: Obtain a grid map corresponding to an application, the grid map referring to a gridded map.

In this example of the present subject matter, the grid map refers to a map obtained by gridding a navigation map corresponding to the application, namely by dividing the navigation map into a plurality of grids of the same size. The application may be, for example, a gaming application, a simulative learning application, and any application having a path-finding function. This example of the present subject matter is not limited thereto.

Step 1102: Obtain a plurality of volume levels supported by the application, the volume level is used for measuring an occupied region of a virtual object in the application.

In some examples, the virtual object may be a virtual character or a virtual vehicle controlled by a user account in the application, or may be a virtual item or a non-player character (NPC) in a virtual environment corresponding to the application. The virtual object is not limited in this example of the present subject matter. The virtual object may be any object capable of participating in path-finding computation. The occupied region may be a circular region, a square region, or an irregular region. As the volume level of the virtual object is higher, the occupied region thereof is larger.

Step 1103: Mark the grid map according to the plurality of volume levels to obtain a navigation grid map corresponding to the application. The navigation grid map is marked with a primary region and a secondary region. A passage level of the primary region allows passage of virtual objects under volume levels. The secondary region includes a plurality of sub-secondary regions at different passage levels. The virtual objects allowed for passage by the passage levels of the sub-secondary regions correspond to different maximum volume levels.

In this example of the present subject matter, the passage level may be used for measuring passage capabilities of grids or regions in the navigation grid map. As the passage levels of the grids (or regions) are higher, the volume levels of the virtual objects allowed for passage are higher. In some examples, the passage levels correspond to the volume levels one by one. For example, the passage levels are equal to the volume levels.

In an example, the navigation grid map obtaining process may include the following contents:

1: Mark the grid map based on a maximum volume level in the plurality of volume levels to obtain an initial navigation grid map. The initial navigation grid map includes the primary region and an initial secondary region.

Figure 12:
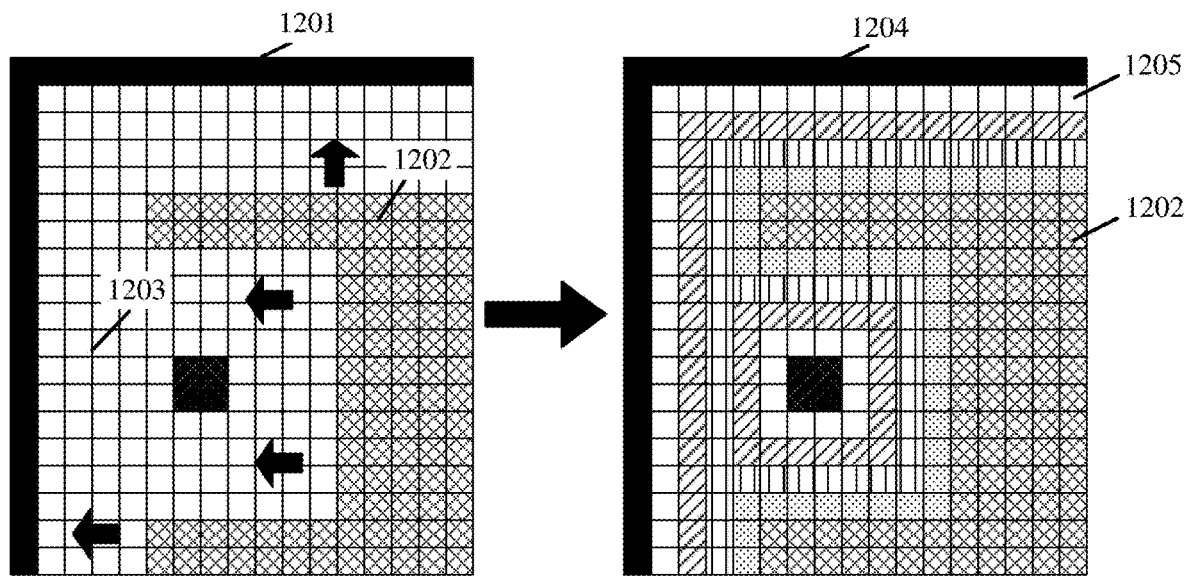
FIG. 12 shows a schematic diagram of sub-secondary region distribution.

In some examples, the initial secondary region refers to a region other than the primary region in the grid map. The application supports four volume levels, which are ranked in ascending order of sizes of the volume levels: a first-order volume level (corresponding to a first-order passage level), a second-order volume level (corresponding to a second-order passage level), a third-order volume level (corresponding to a third-order passage level), and a fourth-order volume level (corresponding to a fourth-order passage level). Referring to FIG. 12, the grid map is marked based on the fourth-order volume level to obtain an initial navigation grid map 1201. The initial navigation grid map 1201 includes a primary region 1202 (at the fourth-order passage level correspondingly) and an initial secondary region 1203.

2: Mark the initial secondary region in the initial navigation grid map based on remaining volume levels other than the maximum volume level in the plurality of volume levels to obtain the navigation grid map.

Based on the foregoing example, the remaining volume levels include a first-order volume level, a second-order volume level, and a third-order volume level. The initial secondary region 1203 is marked based on the first-order volume level, the second-order volume level, and the third-order volume level to obtain a navigation grid map 1204. The navigation grid map 1204 is marked with the primary region 1202 and a secondary region 1205 including a plurality of sub-secondary regions. The passage level of the sub-secondary region adjacent to the primary region is the third-order passage level. The passage level of the sub-secondary region adjacent to the edge region is the zero-order passage level. The passage level of the sub-secondary region spaced apart from the edge region by one grid is the first-order passage level. The passage level of the sub-secondary region spaced apart from the edge region by two grids is the second-order passage level. The passage level of the sub-secondary region spaced apart from the edge region by three grids is the third-order passage level. The passage level corresponding to the primary region is the fourth-order passage level.

In an example, the specific sub-secondary region dividing process may be as follows: determining a plurality of passage levels corresponding to the secondary region based on the remaining volume levels, the plurality of passage levels corresponding to the remaining volume levels one by one; setting initial passage levels of grids in the secondary region as minimum passage levels; performing step-by-step recursion on passage levels of secondary grids in the initial secondary regions by taking a grid as a step and the primary region to an edge region in the navigation grid map as a direction, to obtain the passage levels of the secondary grids in the initial secondary regions, the secondary grids referring to the grids in the secondary regions; and determining, for a target passage level in the plurality of passage levels, a region constituted by secondary grids having the target passage level as a target sub-secondary region, and determining the target passage level as a passage level of the target sub-secondary region. In some examples, the initial passage level is the zero-order passage level, namely, the minimum passage level.

When a longest distance between the primary region and the edge region is s (s is a positive integer) grids, according to a passage level of an association grid corresponding to a secondary grid spaced apart from the primary region by 0 grids, a passage level of the secondary grid spaced apart from the primary region by 0 grids is determined for a first step-by-step recursion.

According to a passage level of an association grid corresponding to a secondary grid spaced apart from the primary region by x−1 grids, a passage level of the secondary grid spaced apart from the primary region by x−1 grids is determined for an xth step-by-step recursion. Based on the passage level of the secondary grid spaced apart from the primary region by x−1 grids, a passage level of a secondary grid in a region spaced apart from the primary region by x−1 grids is re-determined. x is greater than 1 and less than or equal to s.

When the passage levels of the secondary grids are no longer changed, step-by-step recursions for the passage levels are stopped to obtain the passage levels of the secondary grids. The passage levels of the secondary grids are no longer re-determined in response to the passage levels of the secondary grids is a maximum passage level corresponding to the secondary region.

In some examples, for a target secondary grid in the secondary grids, a target passage level corresponding to the target secondary grid is obtained. The target passage level refers to a minimum passage level in passage levels of association grids corresponding to the target secondary grid. The target passage level is advanced to obtain a passage level of the target secondary grid. For example, based on the foregoing example, when the target passage level is the first-order passage level, the second-order passage level may be determined as the passage level of the target secondary grid. When the target passage level is the third-order passage level, the passage level of the target secondary grid is no longer updated.

In an example, the association grid corresponding to the target secondary grid includes four grids adjacent to the target secondary grid, or eight grids other than the target secondary grid in a square region where the target secondary grid is the center and the side length is three grids. In a case that the association grid corresponding to the target secondary grid includes four grids, the four grids may be an upper grid, a lower grid, a left grid, and a right grid corresponding to the target secondary grid. When the association grid corresponding to the target secondary grid includes eight grids, the eight grids may be an upper grid, a lower grid, a left grid, a right grid, an upper left grid, an upper right grid, a lower left grid, and a lower right grid corresponding to the target secondary grid.

Figure 13:
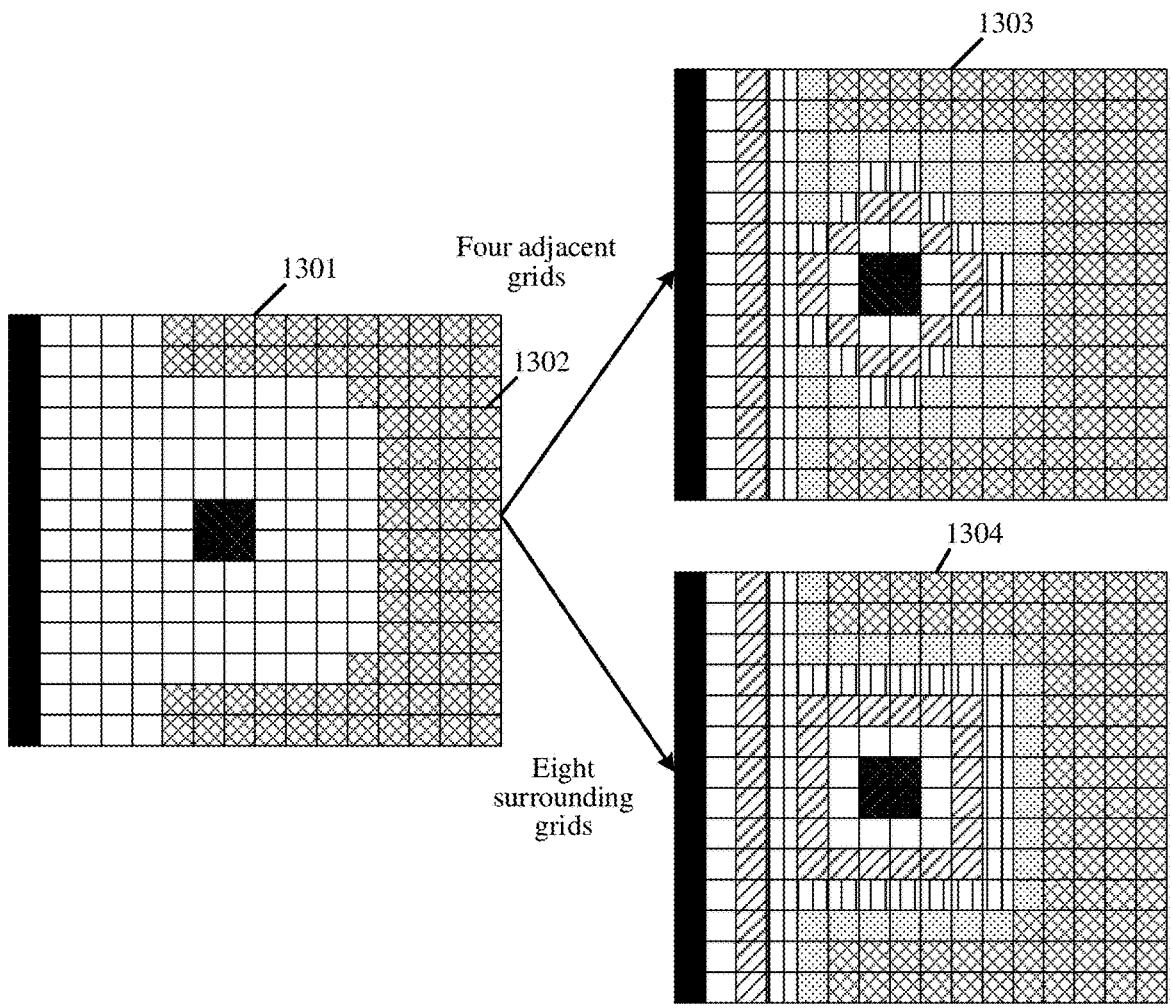
FIG. 13 shows a schematic diagram of sub-secondary region distribution under different passage level determining methods.

In some examples, different sub-secondary regions are obtained for different numbers of association grids. In addition, different ranges of primary regions are obtained for different shapes of occupied regions. For example, referring to FIG. 12 and FIG. 13, the primary region 1202 of the initial navigation grid map 1201 is a primary region corresponding to a circular occupied region, a primary region 1302 of an initial navigation grid map 1301 is a primary region corresponding to a square occupied region, and the primary region 1202 and the primary region 1302 are different. In FIG. 13, when the passage level of the target secondary grid is determined based on the passage levels of four adjacent grids, a navigation grid map 1303 may be obtained. When the passage level of the target secondary grid is determined based on the passage levels of eight surrounding grids, a navigation grid map 1304 may be obtained. A sub-secondary region corresponding to a third-order passage level in the navigation grid map 1303 is greater than a sub-secondary region corresponding to a third-order passage level in the navigation grid map 1304.

Figure 14:
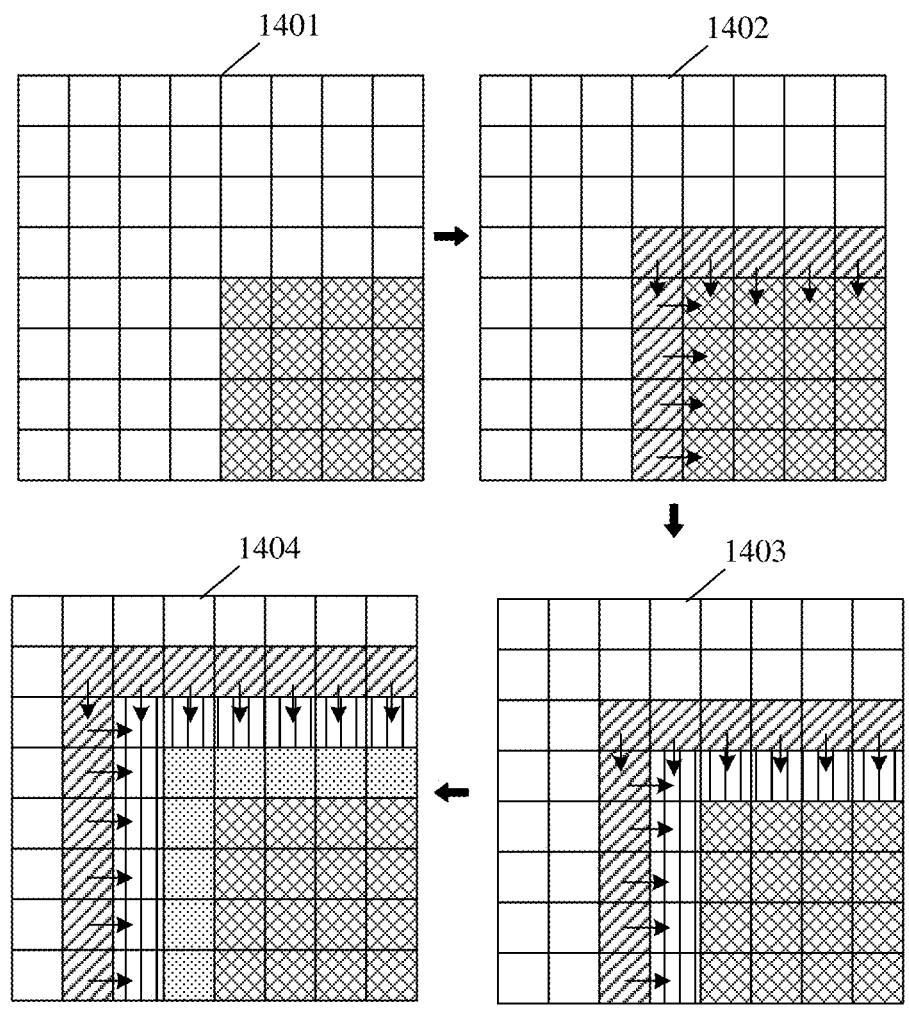
FIG. 14 shows a schematic diagram of a step-by-step recursion process.

In an example, referring to FIG. 14, the step-by-step recursion process is introduced with four adjacent grids. Based on the foregoing example, it is assumed that the navigation grid map corresponds to four volume levels. Initial passage levels of secondary grids in an initial secondary region in an initial navigation grid map 1401 are set as zero-order passage levels.

The passage level of the secondary grid adjacent to the primary region is first determined in the first step-by-step recursion process to obtain a middle navigation grid map 1402. In some examples, in this process, guide grids of the secondary grid adjacent to the primary region, namely primary grids adjacent thereto, may be determined. Also, direction guide information (for example, black arrows in FIG. 14) of the secondary grid adjacent to the primary region is generated.

The passage level of the secondary grid spaced apart from the primary region by one grid is first determined in the second step-by-step recursion process, and then the passage level of the secondary grid adjacent to the primary region is re-determined based on the passage level of the secondary grid spaced apart from the primary region by one grid, to obtain a middle navigation grid map 1403. In some examples, in this process, guide grids of the secondary grid spaced apart from the primary region by one grid may be determined. Also, direction guide information (for example, black arrows in FIG. 14) of the secondary grid spaced apart from the primary region by one grid is generated.

The passage level of the secondary grid spaced apart from the primary region by two grids is first determined in the third step-by-step recursion process, the passage level of the secondary grid spaced apart from the primary region by one grid is re-determined based on the passage level of the secondary grid spaced apart from the primary region by two grids, and then the passage level of the secondary grid adjacent to the primary region is re-determined based on the passage level of the secondary grid spaced apart from the primary region by one grid, to obtain a navigation grid map 1404. In some examples, in this process, guide grids of the secondary grid spaced apart from the primary region by two grids may be determined. Also, direction guide information (for example, black arrows in FIG. 14) of the secondary grid spaced apart from the primary region by two grids is generated.

Regardless of determining the passage level of a grid adjacent to the edge region using four adjacent grids or eight surrounding grids, the grid adjacent to the edge region is kept at the initial passage level (namely, zero-order passage level) since the grid of the edge region is included. That is, virtual objects under four volume levels cannot reach.

In an example, the jump point grid determining process may be as follows: obtaining a plurality of precedence grids, the precedence grids referring to secondary grids adjacent to the primary region; determining a plurality of association point grids from the plurality of precedence grids; and determining jump point grids corresponding to the plurality of association point grids based on direction guide information corresponding to the plurality of association point grids. The jump point grids are used for indicating a secondary navigation path satisfying volume levels of virtual objects in the secondary region. The secondary navigation path includes an association point grid of the jump point grid in the secondary region. The direction guide information is used for recording guide grids corresponding to grids.

In some examples, the passage level of the precedence grid is the maximum passage level in the secondary region, namely, the second maximum passage level corresponding to the navigation grid map. Referring to FIG. 6, a secondary grid adjacent to a primary region 601 may be determined as the precedence grid. The association point grid refers to the precedence grid corresponding to the jump point grid. The jump point grid is a primary guide grid of the association point grid.

In an example, the association point grid obtaining process may be as follows: determining target corner precedence grids, edge precedence grids, and target peak precedence grids in the plurality of precedence grids as candidate association point grids; and eliminating candidate association point grids with a distance therebetween less than a set threshold among the candidate association point grids conservatively to obtain the plurality of association point grids. The target corner precedence grids refer to precedence grids in which four adjacent grids are not all precedence grids. Corner precedence grids refer to precedence grids not in a straight line with two adjacent precedence grids. The edge precedence grids are adjacent to one precedence grid. The target peak precedence grids refer to precedence grids having a precedence value greater than a precedence threshold. Peak precedence grids refer to precedence grids corresponding to peaks in a curve formed by precedence values of a plurality of precedence grids in a straight line. The precedence values are used for representing use demand values of the precedence grids.

Figure 15:
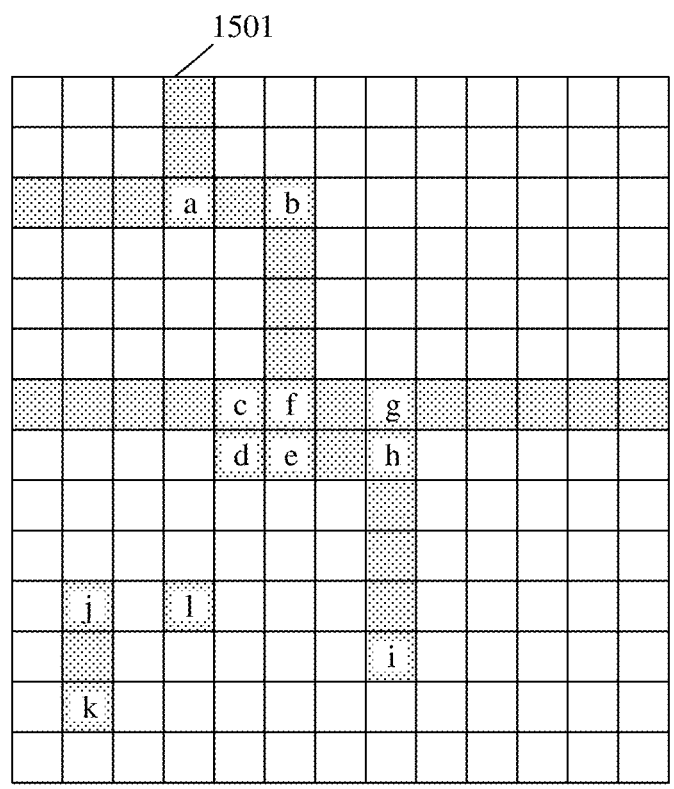
FIG. 15 and FIG. 16 show schematic diagrams of a candidate association point grid.

Reference is made to FIG. 15. FIG. 15 is a simplified diagram only for introducing an association point grid. The present subject matter is not limited. A sub-secondary region 1501 is a region corresponding to precedence grids. Since a precedence grid a, a precedence grid b, a precedence grid c, a precedence grid d, a precedence grid f, a precedence grid e, a grid g, and a precedence grid h are all in a corner region (namely, steering), the precedence grid a, the precedence grid b, the precedence grid c, the precedence grid d, the precedence grid f, the precedence grid e, the grid g, and the precedence grid h are determined as corner precedence grids. However, since the corner precedence grid f is adjacent to precedence grids, the corner precedence grid f is not a target corner precedence grid. That is, the precedence grid a, the precedence grid b, the precedence grid c, the precedence grid d, the precedence grid e, the grid g, and the precedence grid h may be determined as candidate association point grids (namely, target corner precedence grids).

Since a precedence grid i, a precedence grid j, and a precedence grid k are all adjacent to one precedence grid, the precedence grid i, the precedence grid j, and the precedence grid k may be determined as candidate association point grids (namely, edge precedence grids). In some examples, a precedence grid l is a special edge precedence grid not connected to any precedence grid, and thus may be determined as a candidate association point grid.

Figure 16:
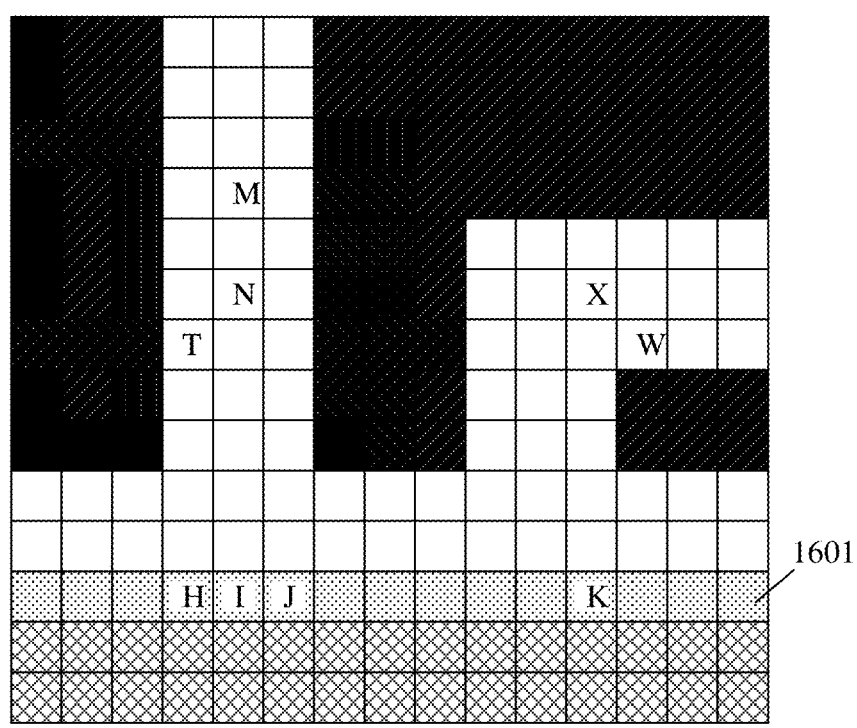

Reference is made to FIG. 16. FIG. 16 is a simplified diagram only for introducing an association point grid. The present subject matter is not limited. A region 1601 is a straight region constituted by a plurality of precedence grids. A precedence grid H may be a precedence grid corresponding to a secondary grid T. A precedence grid I may be a precedence grid corresponding to a secondary grid M and a secondary grid N. A precedence grid K may be a precedence grid corresponding to a secondary grid X and a secondary grid W. Precedence values of the precedence grids may be calculated sequentially according to use demand values corresponding to the precedence grids (from left to right): 2, 2, 2, 11, 11, 11, 2, 2, 2, 7, 7, 16, 2, 2, and 2. In this way, a precedence value curve corresponding to the region 1401 may be obtained. Then a plurality of peak points in the precedence value curve are found (if a peak has a plurality of identical values, the peak points are marked as peak precedence grids), thereby obtaining a plurality of peak precedence grids: a precedence grid H, a precedence grid I, a precedence grid J, and a precedence grid K. The precedence values of the plurality of precedence grids are averaged to obtain an average value. The average value is then adjusted based on a set multiplying power (for example, 2) to obtain a precedence threshold. Only when the precedence value of the peak precedence grid is greater than the precedence threshold, the peak precedence grid is determined as a target peak precedence grid. Since the precedence values of the precedence grid H, the precedence grid I, the precedence grid J, and the precedence grid K are greater than the precedence threshold, the precedence grid H, the precedence grid I, the precedence grid J, and the precedence grid K may be determined as candidate association point grids. The multiplying power may be adjusted according to navigation grid maps of different items. As there are more small obstacles of the navigation grid maps, the multiplying power may be increased.

In some examples, after the candidate association point grids are determined, the candidate association point grids may be screened to optimize the association point grids. Referring to FIG. 16, since the distance between the candidate association point grids H, I, and J is less than a set threshold (for example, three grids), one of the candidate association point grids may be retained as an association point grid. The optimization process is only applicable to candidate association point grids in the same secondary region.

In some examples, after the jump point grids are determined, the distance between the jump point grids may be calculated. Referring to FIG. 6, path-finding is performed in the secondary region sequentially based on every two of jump point grids P, Q, R, S, T, U, and V, and a shortest secondary navigation path under different passage levels between every two jump point grids is obtained through a Dijkstra algorithm, to optimize the foregoing middle navigation path.

In some examples, the jump point grids may be optimized. For any two jump point grids, when the length of the secondary navigation path corresponding to the two jump point grids is less than the length of the primary navigation path corresponding to the two jump point grids or a ratio between the length of the secondary navigation path corresponding to the two jump point grids and the length of the primary navigation path corresponding to the two jump point grids is less than a threshold, the two jump point grids may be eliminated if the elimination of the two jump point grids does not affect the distance between the other jump point grids.

In summary, according to the technical solution provided by this example of the present subject matter, based on a navigation grid marked with a primary region and a secondary region, a virtual object may perform path-finding in the primary region without the restriction of a passage level, and a navigation path of the virtual object between the primary region and the secondary region may be obtained in combination with a guide grid to satisfy the volume level of the virtual object, thereby ensuring non-clipping and boundary reachability of the virtual object, and improving the rationality of the navigation path.

In addition, by storing direction guide information, jump point grids, and a secondary navigation path corresponding to the jump point grids under different passage levels for a navigation grid map simultaneously, the navigation path between the secondary region and the primary region and a middle navigation path may be quickly determined based on the direction guide information, the jump point grids, and the secondary navigation path corresponding to the jump point grids under different passage levels in the path-finding process, thereby effectively improving the obtaining efficiency of the navigation path.

The following describes apparatus examples of the present subject matter, which may be used for executing the method examples of the present subject matter. Details not disclosed in the apparatus examples of the present subject matter may be similar to those in the method examples of the present subject matter.

Figure 17:
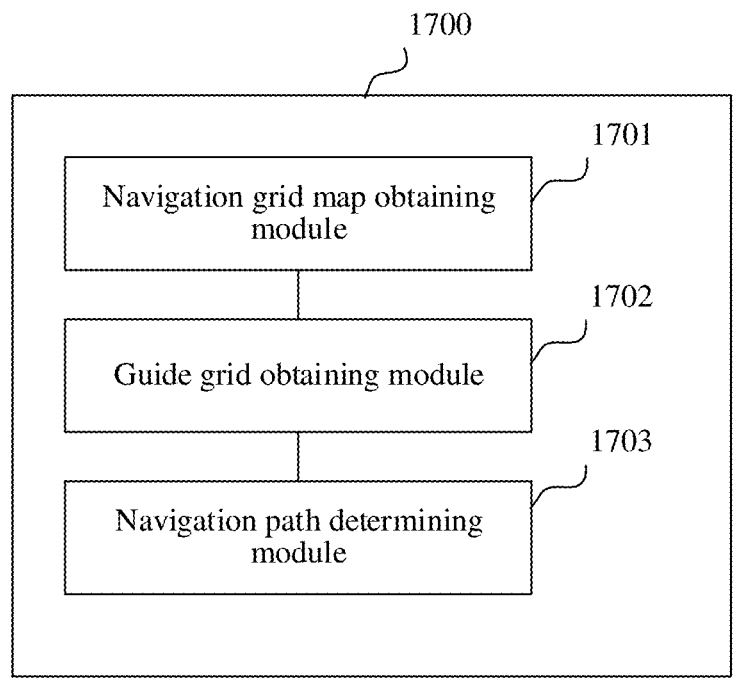
FIG. 17 is a block diagram of a navigation path determining apparatus according to an example of the present subject matter.

FIG. 17 shows a block diagram of a navigation path determining apparatus according to an example of the present subject matter. The apparatus has a function of implementing the foregoing method examples. The function may be implemented by hardware or may be implemented by hardware executing corresponding software. The apparatus may be a computer device as described above or may be disposed in the computer device. As shown in FIG. 17, the apparatus 1700 includes: a navigation grid map obtaining module 1701, a guide grid obtaining module 1702, and a navigation path determining module 1703.

The navigation grid map obtaining module 1701 is configured to obtain a navigation grid map corresponding to an application. The navigation grid map is marked with a primary region and a secondary region. A passage level of the primary region allows passage of virtual objects under volume levels in the application. The secondary region includes a plurality of sub-secondary regions at different passage levels. The virtual objects allowed for passage by the passage levels of the sub-secondary regions correspond to different maximum volume levels.

The guide grid obtaining module 1702 is configured to obtain, for a target grid corresponding to a target virtual object, at least one guide grid corresponding to the target grid. The target grid is located in the secondary region. A passage level of the guide grid is greater than or equal to a passage level of the target grid.

The navigation path determining module 1703 is configured to determine, based on the guide grid, a navigation path of the target virtual object between the target grid and the primary region.

In an example, the navigation path determining module 1703 is configured to:

determine, based on the passage level of the guide grid and a volume level of the target virtual object, the navigation path of the target virtual object between the target grid and the primary region when the passage level of the target grid does not allow passage of the target virtual object; and or, determine a path combined by the guide grids as the navigation path of the target virtual object between the target grid and the primary region when the passage level of the target grid allows passage of the target virtual object.

In an example, the guide grid includes a primary guide grid and a secondary guide grid. The primary guide grid refers to a grid adjacent to the secondary region in the primary region. The secondary guide grid refers to a grid in the secondary region.

The navigation path determining module 1703 is further configured to:

select a target secondary guide grid from secondary guide grids corresponding to the target grid based on the passage level of the guide grid and the volume level of the target virtual object, a passage level of the target secondary guide grid allowing passage of the target virtual object, and a distance between the target secondary guide grid and the target grid is less than a distance between another secondary guide grid in the secondary guide grids corresponding to the target grid and the target grid;

determine a path combined by the target secondary guide grid, the secondary guide grids between the target secondary guide grid and primary guide grids corresponding to the target grid, and the primary guide grids corresponding to the target grid as the navigation path of the target virtual object between the target grid and the primary region in the presence of the target secondary guide grid; and determine a path combined by the primary guide grids corresponding to the target grid as the navigation path of the target virtual object between the target grid and the primary region in the absence of the target secondary guide grid.

In an example, the guide grid obtaining module 1702 is configured to:

obtain direction guide information corresponding to the navigation grid map, the direction guide information is used for recording guide grids corresponding to grids; and obtain at least one guide grid corresponding to the target grid according to the direction guide information.

The first guide grid corresponding to the target grid is determined according to the direction guide information of the target grid. An n+1th guide grid corresponding to the target grid is determined according to the direction guide information of an nth guide grid corresponding to the target grid. The n+1 th guide grid is adjacent to the nth guide grid. n is a positive integer.

In an example, the target grid includes a start grid and an end grid. The apparatus 1700 further includes: a middle path obtaining module (not shown in FIG. 17).

The middle path obtaining module is configured to perform path-finding in the primary region based on a primary guide grid corresponding to the start grid and a primary guide grid corresponding to the end grid to obtain a middle navigation path between the primary guide grid corresponding to the start grid and the primary guide grid corresponding to the end grid.

The navigation path determining module 1703 is further configured to combine the middle navigation path, a navigation path connecting the start grid and the primary region, and a navigation path connecting the end grid and the primary region to obtain a navigation path of the target virtual object between the start grid and the end grid.

In an example, the middle path obtaining module is configured to:

perform path-finding in the primary region by taking the primary guide grid corresponding to the start grid as a start and the primary guide grid corresponding to the end grid as an end to obtain a candidate middle navigation path; and optimize, according to a jump point grid in the primary region, the candidate middle navigation path to obtain the middle navigation path.

The jump point grid is used for indicating the presence of a secondary navigation path satisfying the volume level of the target virtual object in the secondary region. The secondary navigation path includes an association point grid of the jump point grid in the secondary region.

In an example, the middle path obtaining module is further configured to:

perform path-finding in the primary region according to the jump point grid to obtain a primary navigation path corresponding to the middle navigation path; and replace, when a length relationship between a secondary navigation path corresponding to the jump point grid and the primary navigation path satisfies a first condition, the primary navigation path with the secondary navigation path to obtain the middle navigation path.

In an example, the middle path obtaining module is further configured to:

obtain a passage level of a straight path between the end grid and the start grid when a distance between the end grid and the start grid is less than a threshold and the end grid and the start grid are located in a same secondary region; and determine the straight path as the navigation path of the target virtual object between the start grid and the end grid when the passage level of the straight path allows passage of the target virtual object.

A minimum passage level is selected from passage levels of grids bypassed by the straight path and determined as the passage level of the straight path.

In summary, according to the technical solution provided by this example of the present subject matter, based on a navigation grid marked with a primary region and a secondary region, a virtual object may perform path-finding in the primary region without the restriction of a passage level, and a navigation path of the virtual object between the primary region and the secondary region may be obtained in combination with a guide grid to satisfy the volume level of the virtual object, thereby ensuring non-clipping and boundary reachability of the virtual object, and improving the rationality of the navigation path.

FIG. 17 also shows a block diagram of a navigation path determining apparatus according to another example of the present subject matter. This example may include the following content.

A navigation grid map obtaining module 1701 is configured to obtain a navigation grid map. The navigation grid map is marked with a primary region and a secondary region. A passage level of the primary region allows passage of vehicles under volume levels. The secondary region includes a plurality of sub-secondary regions at different passage levels. The vehicles allowed for passage by the passage levels of the sub-secondary regions correspond to different maximum volume levels.

A guide grid obtaining module 1702 is configured to obtain, for a target grid corresponding to a target vehicle, at least one guide grid corresponding to the target grid. The target grid is located in the secondary region. A passage level of the guide grid is greater than or equal to a passage level of the target grid.

A navigation path determining module 1703 is configured to determine, based on the guide grid, a navigation path of the target vehicle between the target grid and the primary region.

Details not detailed in this example may be similar to the corresponding examples of FIG. 2, FIG. 5, and FIG. 9.

In summary, according to the technical solution provided by this example of the present subject matter, based on a navigation grid marked with a primary region and a secondary region, a vehicle may perform path-finding in the primary region without the restriction of a passage level, and a navigation path of the vehicle between the primary region and the secondary region may be obtained in combination with a guide grid to satisfy the volume level of the vehicle, whereby vehicles at different volume levels are based on the same navigation grid map in a real path-finding scene to avoid the problem of collision between a vehicle (for example, a car) and an edge region (for example, a road boundary), thereby improving the rationality of the navigation path. Also, for vehicles at different volume levels, there is no need to specifically generate navigation grid maps corresponding to the passage levels, thereby reducing the workload of making the navigation grid maps and saving costs.

Figure 18:
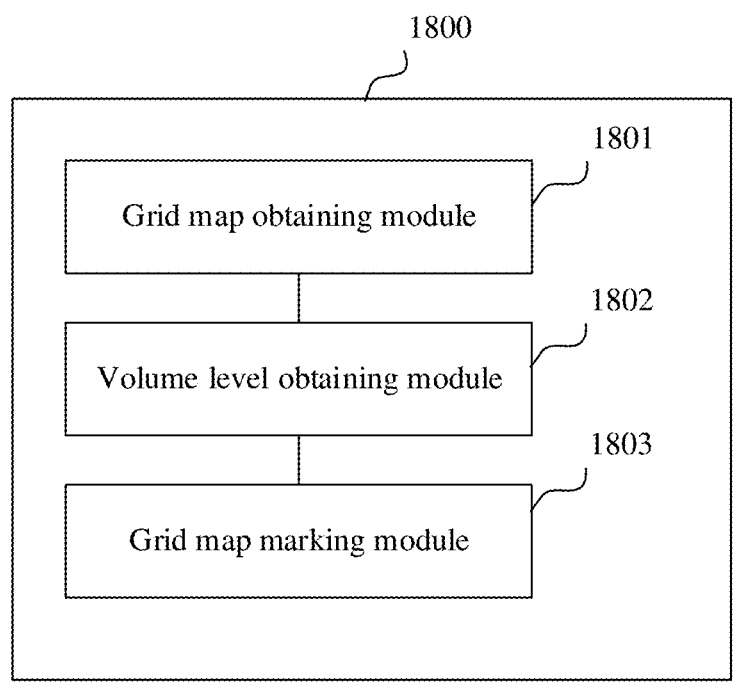
FIG. 18 is a block diagram of a navigation grid map generating apparatus according to an example of the present subject matter.

FIG. 18 shows a block diagram of a navigation grid map generating apparatus according to an example of the present subject matter. The apparatus has a function of implementing the foregoing method examples. The function may be implemented by hardware or may be implemented by hardware executing corresponding software. The apparatus may be a computer device as described above or may be disposed in the computer device. As shown in FIG. 18, the apparatus 1800 includes: a grid map obtaining module 1801, a volume level obtaining module 1802, and a grid map marking module 1803.

The grid map obtaining module 1801 is configured to obtain a grid map corresponding to an application. The grid map refers to a gridded map.

The volume level obtaining module 1802 is configured to obtain a plurality of volume levels supported by the application. The volume level is used for measuring an occupied region of a virtual object in the application.

The grid map marking module 1803 is configured to mark the grid map according to the plurality of volume levels to obtain a navigation grid map corresponding to the application.

The navigation grid map is marked with a primary region and a secondary region. A passage level of the primary region allows passage of the virtual objects under the volume levels. The secondary region includes a plurality of sub-secondary regions at different passage levels. The virtual objects allowed for passage by the passage levels of the sub-secondary regions correspond to different maximum volume levels.

In an example, the grid map marking module 1803 is configured to:

mark the grid map based on a maximum volume level in the plurality of volume levels to obtain an initial navigation grid map, the initial navigation grid map including the primary region and an initial secondary region; and mark the initial secondary region in the initial navigation grid map based on remaining volume levels other than the maximum volume level in the plurality of volume levels to obtain the navigation grid map.

In an example, the grid map marking module 1803 is further configured to:

determine a plurality of passage levels corresponding to the secondary region based on the remaining volume levels, the plurality of passage levels corresponding to the remaining volume levels one by one;

set initial passage levels of grids in the secondary region as minimum passage levels;

perform step-by-step recursion on passage levels of secondary grids in the initial secondary regions by taking a grid as a step and the primary region to an edge region in the navigation grid map as a direction, to obtain the passage levels of the secondary grids in the initial secondary regions, the secondary grids referring to the grids in the secondary regions; and determine, for a target passage level in the plurality of passage levels, a region constituted by secondary grids having the target passage level as a target sub-secondary region, and determine the target passage level as a passage level of the target sub-secondary region.

In an example, a longest distance between the primary region and the edge region is s grids, s is a positive integer.

The grid map marking module 1803 is further configured to:

determine, according to a passage level of an association grid corresponding to a secondary grid spaced apart from the primary region by 0 grids, a passage level of the secondary grid spaced apart from the primary region by 0 grids for a first step-by-step recursion;

determine, according to a passage level of an association grid corresponding to a secondary grid spaced apart from the primary region by x−1 grids, a passage level of the secondary grid spaced apart from the primary region by x−1 grids for an xth step-by-step recursion, and re-determine, based on the passage level of the secondary grid spaced apart from the primary region by x−1 grids, a passage level of a secondary grid in a region spaced apart from the primary region by x−1 grids, x is greater than 1 and less than or equal to s; and stop, when the passage levels of the secondary grids are no longer changed, step-by-step recursions for the passage levels to obtain the passage levels of the secondary grids, the passage levels of the secondary grids is no longer re-determined in response to the passage levels of the secondary grids is a maximum passage level corresponding to the secondary region.

In an example, the grid map marking module 1803 is further configured to:

obtain, for a target secondary grid in the secondary grids, a target passage level corresponding to the target secondary grid, the target passage level referring to a minimum passage level in passage levels of association grids corresponding to the target secondary grid; and advance the target passage level to obtain a passage level of the target secondary grid.

In an example, the apparatus 1800 further includes: a precedence grid obtaining module, an association point grid determining module, and a jump point grid determining module (not shown in FIG. 18).

The precedence grid obtaining module is configured to obtain a plurality of precedence grids, the precedence grids referring to secondary grids adjacent to the primary region.

The association point grid determining module is configured to determine a plurality of association point grids from the plurality of precedence grids.

The jump point grid determining module is configured to determine jump point grids corresponding to the plurality of association point grids based on direction guide information corresponding to the plurality of association point grids. The jump point grids are used for indicating a secondary navigation path satisfying volume levels of virtual objects in the secondary region. The secondary navigation path includes an association point grid of the jump point grid in the secondary region. The direction guide information is used for recording guide grids corresponding to grids.

In an example, the association point grid determining module is configured to:

determine target corner precedence grids, edge precedence grids, and target peak precedence grids in the plurality of precedence grids as candidate association point grids; and eliminate candidate association point grids with a distance therebetween less than a set threshold among the candidate association point grids conservatively to obtain the plurality of association point grids.

The target corner precedence grids refer to precedence grids in which four adjacent grids are not all precedence grids. Corner precedence grids refer to precedence grids not in a straight line with two adjacent precedence grids. The edge precedence grids are adjacent to one precedence grid. The target peak precedence grids refer to precedence grids having a precedence value greater than a precedence threshold. Peak precedence grids refer to precedence grids corresponding to peaks in a curve formed by precedence values of a plurality of precedence grids in a straight line. The precedence values are used for representing use demand values of the precedence grids.

In summary, according to the technical solution provided by this example of the present subject matter, based on a navigation grid marked with a primary region and a secondary region, a virtual object may perform path-finding in the primary region without the restriction of a passage level, and a navigation path of the virtual object between the primary region and the secondary region may be obtained in combination with a guide grid to satisfy the volume level of the virtual object, thereby ensuring non-clipping and boundary reachability of the virtual object, and improving the rationality of the navigation path.

The apparatus provided in the foregoing examples is illustrated with an example of division of the foregoing function modules during the implementation of the functions thereof. In practical application, the foregoing functions may be allocated to and completed by different function modules according to requirements. That is, the internal structure of the device is divided into different function modules, so as to complete all or part of the functions described above. In addition, the apparatus provided in the foregoing embodiments and the method embodiments fall within the same conception. A specific implementation process is described in detail with reference to the method embodiments and will not be repeated herein.

Figure 19:
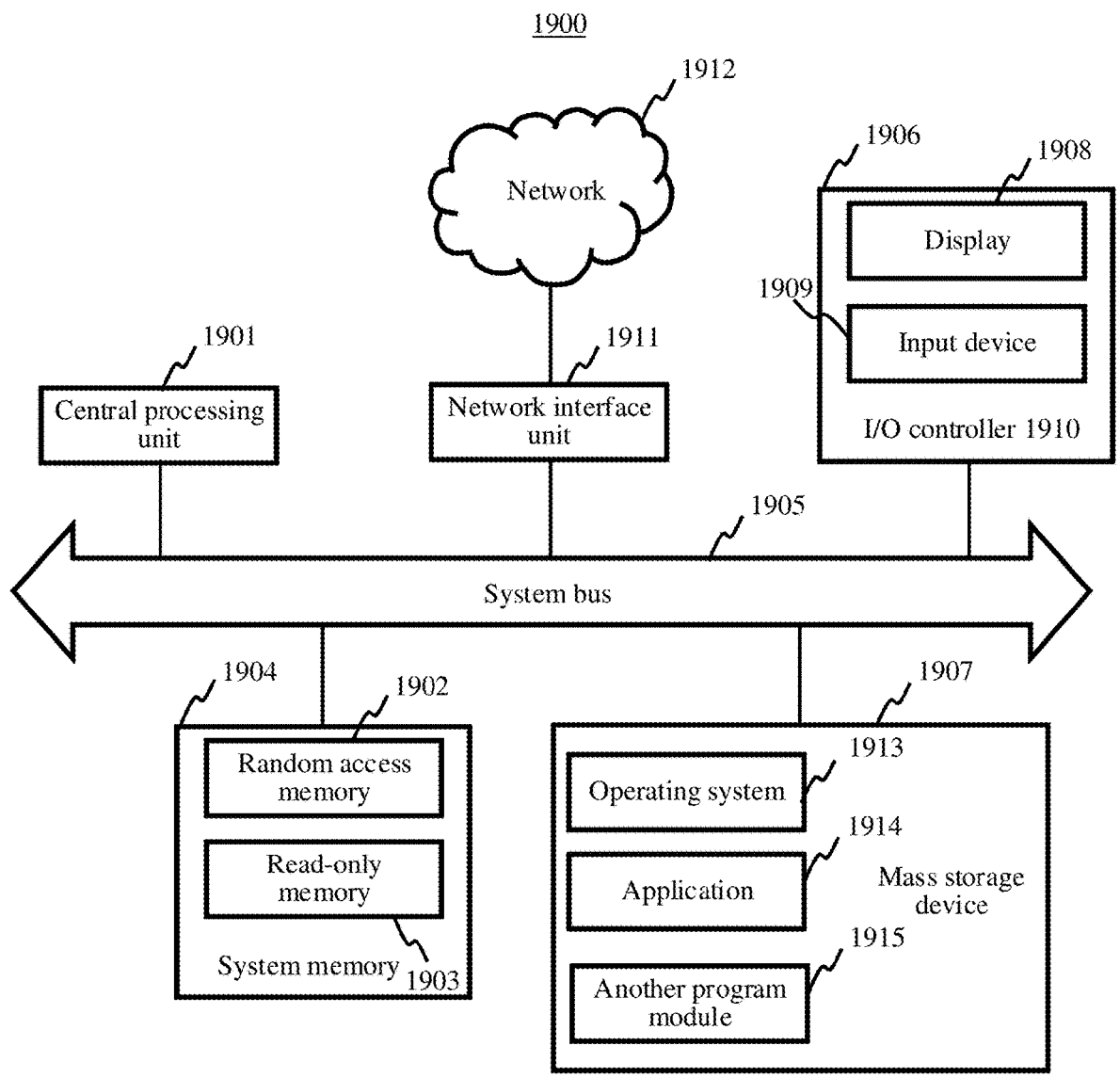
FIG. 19 is a block diagram of a computer device according to an example of the present subject matter.

FIG. 19 shows a structural block diagram of a computer device according to an example of the present subject matter. The computer device may be configured to implement the navigation path determining method or the navigation grid map generating method provided in the foregoing examples. This example may specifically include the following content.

The computer device 1900 includes a central processing unit (for example, a central processing unit (CPU), a graphics processing unit (GPU), and a field programmable gate array (FPGA)) 1901, a system memory 1904 including a random-access memory (RAM) 1902 and a read-only memory (ROM) 1903, and a system bus 1905 connecting the system memory 1904 and the central processing unit 1901. The computer device 1900 further includes a basic input/output (I/O) system 1906 that facilitates transfer of information between components within a server, and a mass storage device 1907 that stores an operating system 1913, an application 1914, and another program module 1915.

The basic I/O system 1906 includes a display 1908 configured to display information and an input device 1909, such as a mouse or a keyboard, configured to input information for a user. The display 1908 and the input device 1909 are connected to the central processing unit 1901 through an I/O controller 1910 which is connected to the system bus 1905. The basic I/O system 1906 may further include the I/O controller 1910 for receiving and processing input from a plurality of other devices, such as a keyboard, a mouse, or an electronic stylus. Similarly, the I/O controller 1910 also provides output to a display screen, a printer, or another type of output device.

The mass storage device 1907 is connected to the central processing unit 1901 through a mass storage controller (not shown) connected to the system bus 1905. The mass storage device 1907 and a non-transitory computer-readable medium associated therewith provide non-volatile storage for the computer device 1900. That is, the mass storage device 1907 may include a computer-readable medium (not shown) such as a hard disk or a compact disc read-only memory (CD-ROM) drive.

In general, the computer-readable medium may include a non-transitory computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read-only memory (EPROM), an electrically erasable programmable read-only memory (EEPROM), a flash memory or another solid-state memory technology, a CD-ROM, a digital video disc (DVD) or another optical memory, a tape cartridge, a magnetic tape, a magnetic disk memory, or another magnetic storage device. Certainly, a person skilled in the art may learn that the computer storage medium is not limited to the foregoing several types. The foregoing system memory 1904 and mass storage device 1907 may be collectively referred to as a memory.

The term module (and other similar terms such as unit, subunit, submodule, etc.) as used herein may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

According to this example of the present subject matter, the computer device 1900 may further be connected, through a network such as the Internet, to a remote computer on the network and run. That is, the computer device 1900 may be connected to a network 1912 through a network interface unit 1911 which is connected to the system bus 1905, or may be connected to another type of network or remote computer system (not shown) by using the network interface unit 1911.

The memory further includes at least one instruction, at least one program, a code set or an instruction set. The at least one instruction, the at least one program, the code set, or the instruction set is stored in the memory, and configured to be executed by the one or more processors, to implement the foregoing navigation path determining method or navigation grid map generating method.

In an example, a non-transitory computer-readable storage medium is also provided. The storage medium stores at least one instruction, at least one program, a code set, or an instruction set. The at least one instruction, the at least one program, the code set, or the instruction set, when executed by a processor, implements the navigation path determining method or the navigation grid map generating method.

In some examples, the computer-readable storage medium may include: a ROM, a RAM, a solid state drive (SSD), an optical disc, or the like. The RAM may include a resistance random access memory (ReRAM) and a dynamic random access memory (DRAM).

In an example, a computer program product or a computer program is also provided. The computer program product or the computer program includes computer instructions. The computer instructions are stored in a non-transitory computer-readable storage medium. A processor of a computer device reads the computer instructions from the computer-readable storage medium. The processor executes the computer instructions, whereby the computer device performs the foregoing navigation path determining method or navigation grid map generating method.

It is to be understood that "plurality" mentioned in the specification means two or more. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship. In addition, the step numbers described in this specification merely show a possible execution sequence of the steps. In some other examples, the steps may not be performed according to the number sequence. For example, two steps with different numbers may be performed simultaneously, or two steps with different numbers may be performed according to a sequence contrary to the sequence shown in the figure. This is not limited in the examples of the present subject matter.

The above descriptions are merely examples of the present subject matter, but are not intended to limit the present subject matter. Any modification, equivalent replacement, or improvement made within the spirit and principle of the present subject matter shall fall within the protection scope of the present subject matter.

The invention claimed is:

1. A navigation path determining method performed by a computer device, comprising:
   obtaining a navigation grid map corresponding to an application, wherein
   the navigation grid map is marked with a primary region and a secondary region,
   a passage level of the primary region allowing passage of virtual objects under volume levels in the application,
   the secondary region comprises a plurality of sub-secondary regions at different passage levels, and
   the virtual objects allowed for passage by the passage levels of the sub-secondary regions corresponding to different maximum volume levels;
   obtaining, for a target grid corresponding to a target virtual object, at least one guide grid corresponding to the target grid, wherein
   the target grid is located in the secondary region, and
   a passage level of the guide grid is greater than or equal to a passage level of the target grid; and
   determining, based on the guide grid, a navigation path of the target virtual object between the target grid and the primary region.

2. The method according to claim 1, wherein the determining comprises:
   determining, based on the passage level of the guide grid and a volume level of the target virtual object, the navigation path of the target virtual object between the target grid and the primary region when the passage level of the target grid does not allow passage of the target virtual object.

3. The method according to claim 1, wherein the determining comprises:
   determining a path combined by the guide grids as the navigation path of the target virtual object between the target grid and the primary region when the passage level of the target grid allows passage of the target virtual object.

4. The method according to claim 2, wherein
   the guide grid comprises a primary guide grid and a secondary guide grid,
   the primary guide grid refers to a grid adjacent to the secondary region in the primary region,
   the secondary guide grid refers to a grid in the secondary region, and
   the determining of the navigation path of the target virtual object comprises:
   selecting a target secondary guide grid from secondary guide grids corresponding to the target grid based on the passage level of the guide grid and the volume level of the target virtual object, wherein
   a passage level of the target secondary guide grid allows passage of the target virtual object, and a distance between the target secondary guide grid, wherein
   the target grid is less than a distance between another secondary guide grid in the secondary guide grids corresponding to the target grid and the target grid.

5. The method according to claim 4, further comprising:
   determining a path combined by the target secondary guide grid, wherein the secondary guide grids between the target secondary guide grid and the primary guide grid correspond to the target grid, and the primary guide grids correspond to the target grid as the navigation path of the target virtual object between the target grid and the primary region in the presence of the target secondary guide grid.

6. The method according to claim 4, further comprising:

determining a path combined by the primary guide grids corresponding to the target grid as the navigation path of the target virtual object between the target grid and the primary region in the absence of the target secondary guide grid.

7. The method according to claim 1, wherein the obtaining at least one guide grid comprises:

obtaining direction guide information corresponding to the navigation grid map, wherein the direction guide information is used for recording guide grids corresponding to grids; and obtaining at least one guide grid corresponding to the target grid according to the direction guide information, wherein a first guide grid corresponds to the target grid is determined according to the direction guide information of the target grid, an n+1th guide grid corresponding to the target grid is determined according to the direction guide information of an nth guide grid corresponding to the target grid, the n+1th guide grid is adjacent to the nth guide grid, and n is a positive integer.

8. The method according to claim 1, wherein the target grid comprises a start grid and an end grid, after the determining, based on the guide grid, a navigation path of the target virtual object between the target grid and the primary region, and the method further comprises:

performing path-finding in the primary region based on a primary guide grid corresponding to the start grid and a primary guide grid corresponding to the end grid to obtain a middle navigation path between the primary guide grid corresponding to the start grid and the primary guide grid corresponding to the end grid; and combining the middle navigation path, a navigation path connecting the start grid and the primary region, and a navigation path connecting the end grid and the primary region to obtain a navigation path of the target virtual object between the start grid and the end grid.

9. The method according to claim 8, wherein the performing path-finding in the primary region comprises:

performing path-finding in the primary region by taking the primary guide grid corresponding to the start grid as a start and the primary guide grid corresponding to the end grid as an end to obtain a candidate middle navigation path; and optimizing, according to a jump point grid in the primary region, the candidate middle navigation path to obtain the middle navigation path, wherein the jump point grid is used for indicating the presence of a secondary navigation path satisfying the volume level of the target virtual object in the secondary region, and the secondary navigation path comprises an association point grid of the jump point grid in the secondary region.

10. The method according to claim 9, wherein the optimizing comprises:

performing path-finding in the primary region according to the jump point grid to obtain a primary navigation path corresponding to the middle navigation path; and replacing, when a length relationship between a secondary navigation path corresponding to the jump point grid and the primary navigation path satisfies a first condition, the primary navigation path with the secondary navigation path to obtain the middle navigation path.

11. The method according to claim 8, further comprising:

obtaining a passage level of a straight path between the end grid and the start grid when a distance between the end grid and the start grid is less than a threshold and the end grid and the start grid are located in a same secondary region; and determining the straight path as the navigation path of the target virtual object between the start grid and the end grid when the passage level of the straight path allows passage of the target virtual object, wherein a minimum passage level is selected from passage levels of grids bypassed by the straight path and determined as the passage level of the straight path.

12. A navigation grid map generating method performed by a computer device, comprising:

obtaining a grid map corresponding to an application, wherein the grid map refers to a gridded map;

obtaining a plurality of volume levels supported by the application, wherein the volume level is used for measuring an occupied region of a virtual object in the application; and marking the grid map according to the plurality of volume levels to obtain a navigation grid map corresponding to the application, wherein the navigation grid map is marked with a primary region and a secondary region, a passage level of the primary region allows passage of the virtual objects under the volume levels, the secondary region comprises a plurality of sub-secondary regions at different passage levels, and the virtual objects allowed for passage by the passage levels of the sub-secondary regions correspond to different maximum volume levels.

13. The method according to claim 12, wherein the marking the grid map comprises:

marking the grid map based on a maximum volume level in the plurality of volume levels to obtain an initial navigation grid map, wherein the initial navigation grid map comprises the primary region and an initial secondary region; and marking the initial secondary region in the initial navigation grid map based on remaining volume levels other than the maximum volume level in the plurality of volume levels to obtain the navigation grid map.

14. The method according to claim 13, wherein the marking the initial secondary region in the initial navigation grid map comprises:

determining a plurality of passage levels corresponding to the secondary region based on the remaining volume levels, wherein the plurality of passage levels corresponding to the remaining volume levels one by one; and setting initial passage levels of grids in the secondary region as minimum passage levels.

15. The method according to claim 14, further comprising:

performing step-by-step recursion on passage levels of secondary grids in the initial secondary regions by taking a grid as a step and the primary region to an edge region in the navigation grid map as a direction to obtain the passage levels of the secondary grids in the initial secondary regions, wherein the secondary grids refer to the grids in the secondary regions;

determining, for a target passage level in the plurality of passage levels, a region constituted by secondary grids having the target passage level as a target sub-secondary region; and determining the target passage level as a passage level of the target sub-secondary region.

16. The method according to claim 12, wherein the method further comprises:

obtaining a plurality of precedence grids, wherein the precedence grids refer to secondary grids adjacent to the primary region;

determining a plurality of association point grids from the plurality of precedence grids; and determining jump point grids corresponding to the plurality of association point grids based on direction guide information corresponding to the plurality of association point grids, wherein the jump point grids are used for indicating a secondary navigation path satisfying volume levels of virtual objects in the secondary region, the secondary navigation path comprises an association point grid of the jump point grid in the secondary region, and the direction guide information is used for recording guide grids corresponding to grids.

17. The method according to claim 16, wherein the determining a plurality of association point grids from the plurality of precedence grids comprises:

determining target corner precedence grids, edge precedence grids, and target peak precedence grids in the plurality of precedence grids as candidate association point grids; and eliminating candidate association point grids with a distance therebetween less than a set threshold among the candidate association point grids conservatively to obtain the plurality of association point grids, wherein the target corner precedence grids refer to precedence grids in which four adjacent grids are not all precedence grids, corner precedence grids refer to precedence grids not in a straight line with two adjacent precedence grids, the edge precedence grids is adjacent to one precedence grid, the target peak precedence grids refer to precedence grids having a precedence value greater than a precedence threshold, peak precedence grids refer to precedence grids corresponding to peaks in a curve formed by precedence values of a plurality of precedence grids in a straight line, and the precedence values are used for representing use demand values of the precedence grids.

18. A navigation path determining method performed by a computer device, comprising:

obtaining a navigation grid map marked with a primary region and a secondary region, wherein a passage level of the primary region allowing passage of vehicles under volume levels, the secondary region comprises a plurality of sub-secondary regions at different passage levels, and the vehicles allowed for passage by the passage levels of the sub-secondary regions correspond to different maximum volume levels;

obtaining, for a target grid corresponding to a target vehicle, at least one guide grid corresponding to the target grid, wherein the target grid is located in the secondary region, and a passage level of the guide grid is greater than or equal to a passage level of the target grid; and determining, based on the guide grid, a navigation path of the target vehicle between the target grid and the primary region.

19. A computer device, the computer device comprising a processor and a memory, the memory storing a computer program executable by the processor to implement:

the navigation path determining method according to claim 1.

20. A non-transitory computer-readable storage medium storing a computer program executable by a processor to implement the navigation grid map generating method according to claim 12.

\* \* \* \* \*